Figure 1:
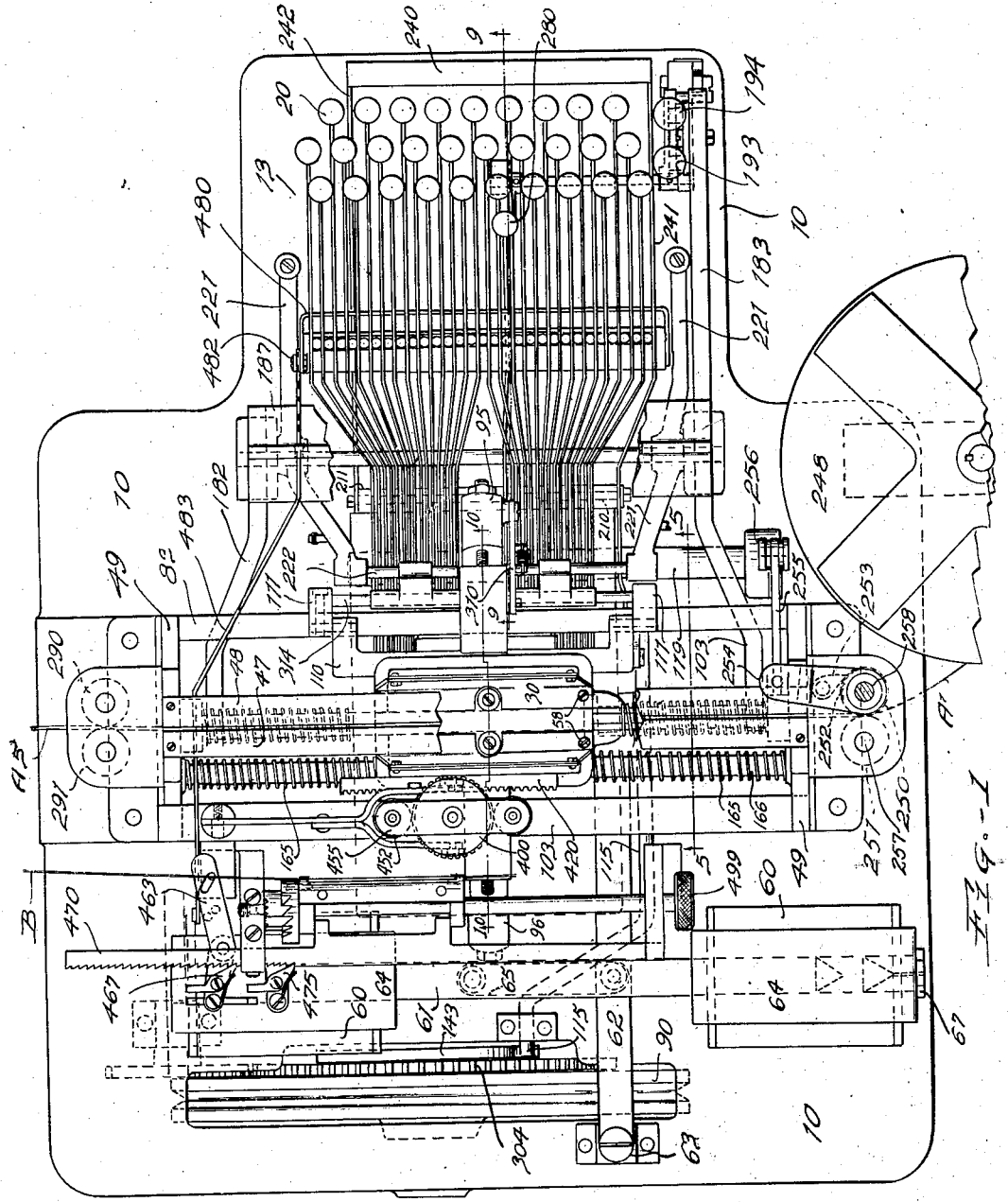

Oct. 20, 1925.

C. CHISHOLM

EMBOSSING MACHINE

Filed Feb. 9, 1922

1,557,754

18 Sheets-Sheet 1

INVENTOR
Clifton Chisholm,
By Baker & Macklin,
ATTORNEYS

Oct. 20, 1925.
C. CHISHOLM
1,557,754
EMBOSSING MACHINE
Filed Feb. 9, 1922
18 Sheets-Sheet 3
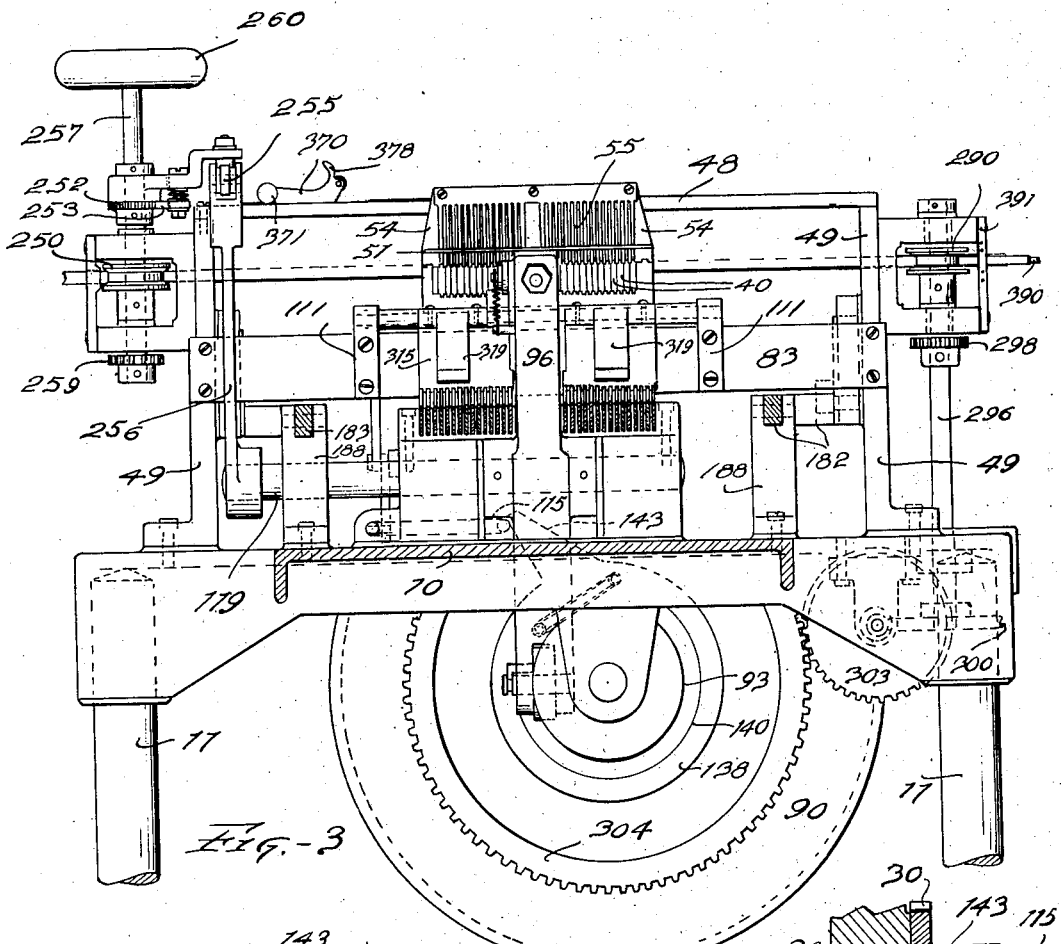
Fig.-3
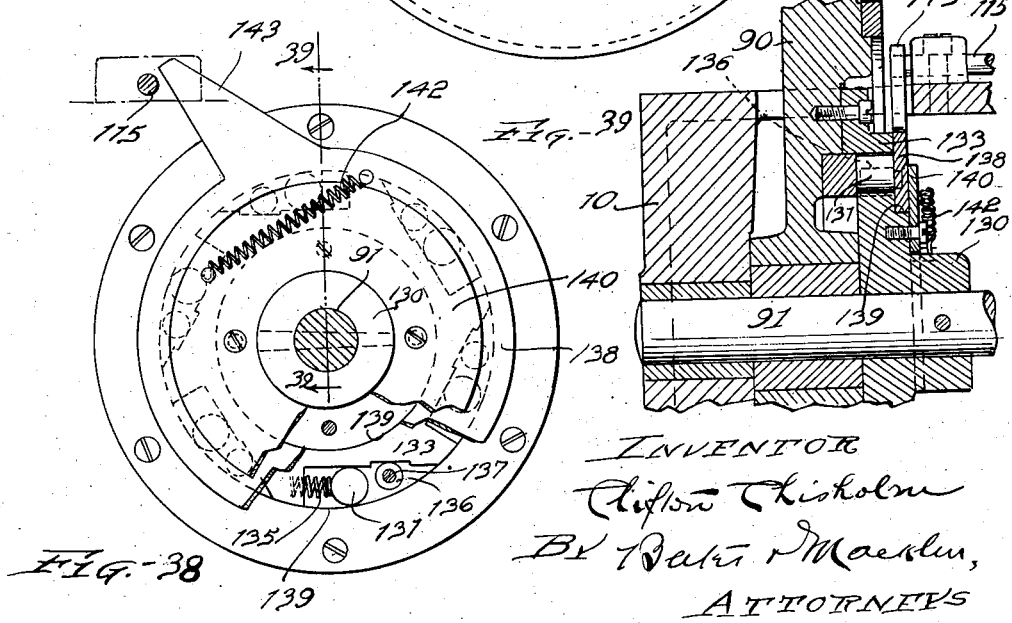
Fig.-38
Fig.-39
INVENTOR
Clifton Chisholm
BY Baker & Maeklin,
ATTORNEYS

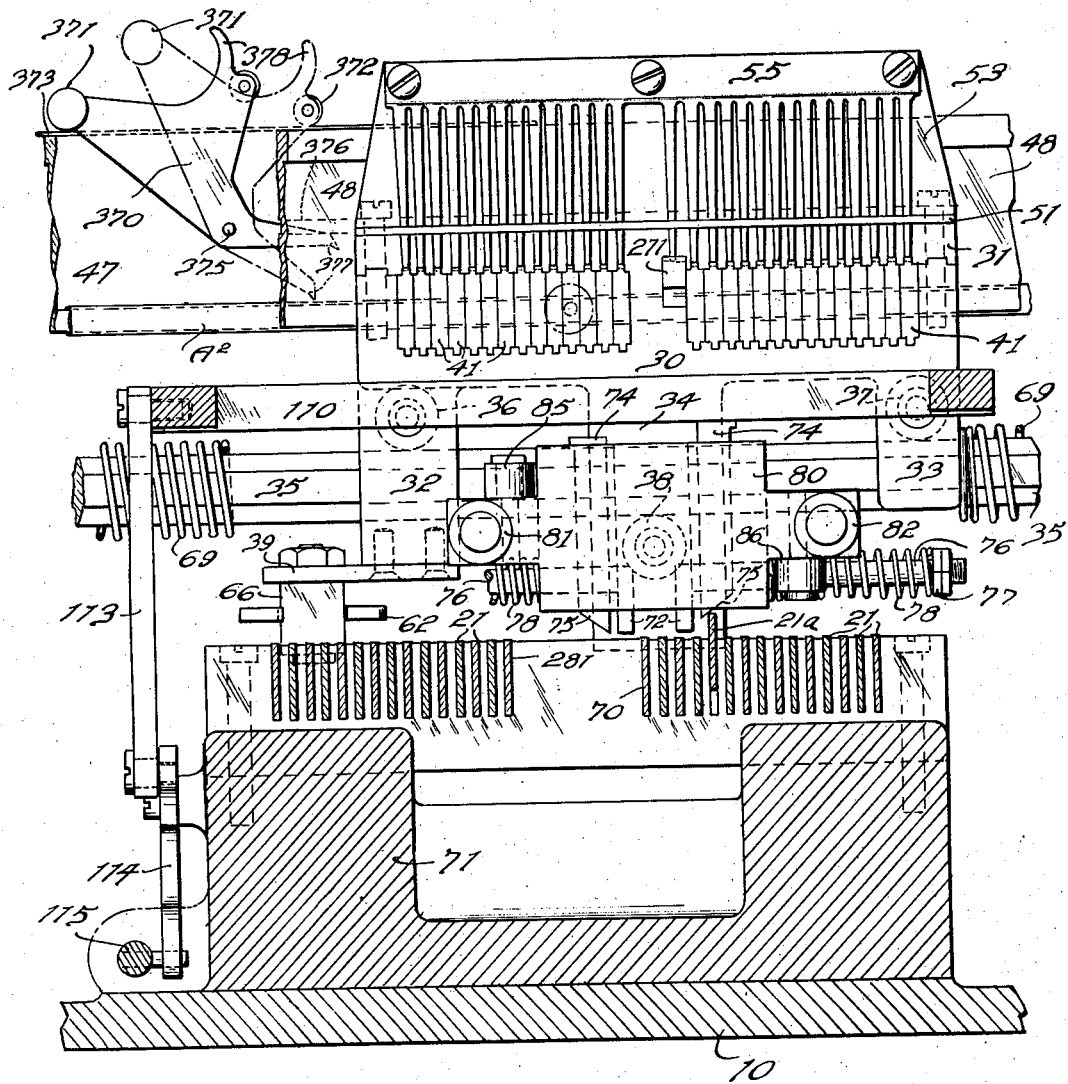

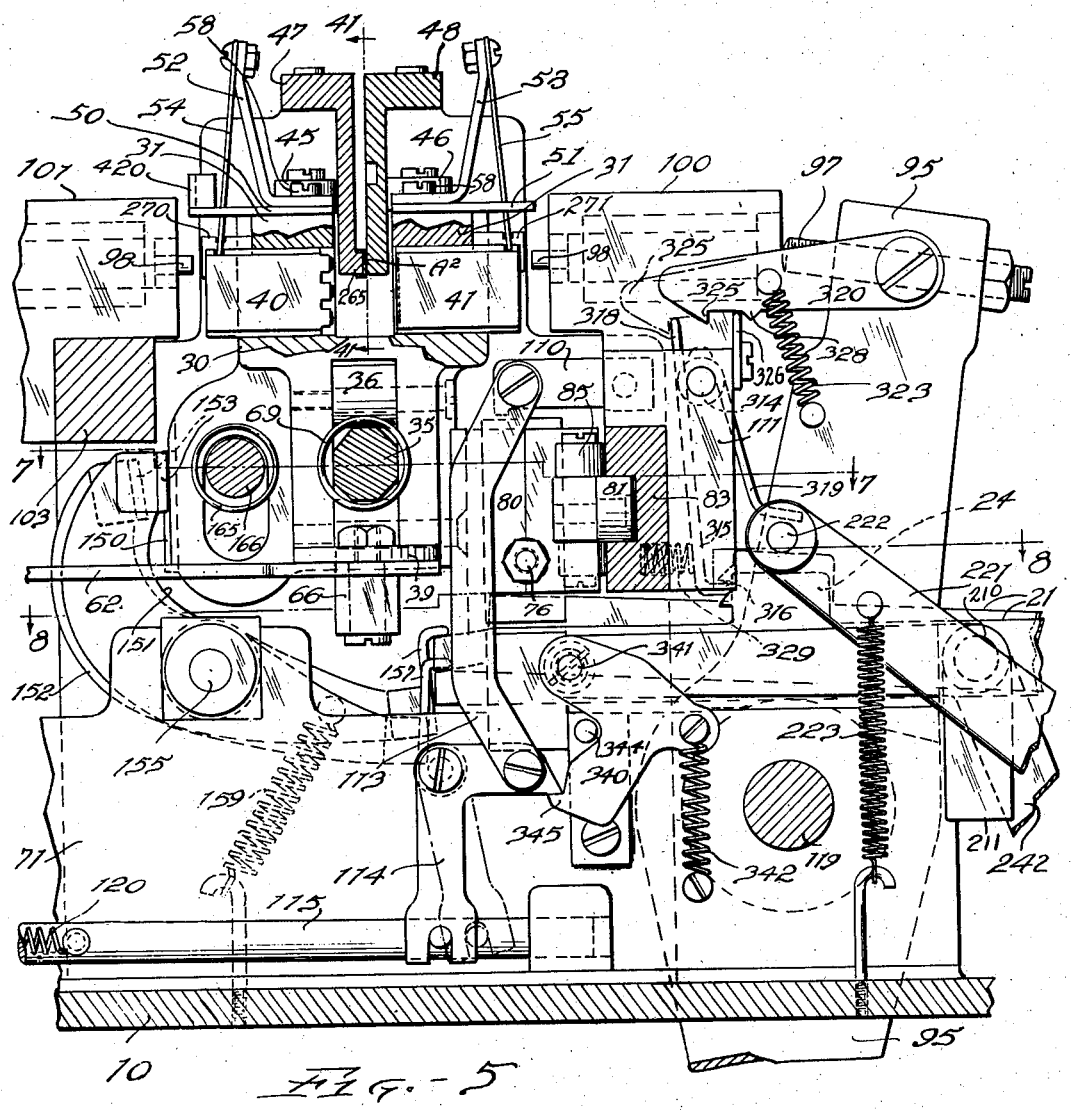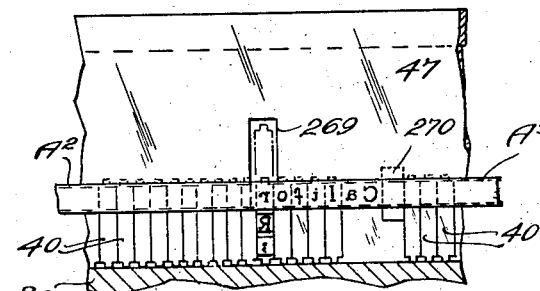

Oct. 20, 1925.

C. CHISHOLM 1,557,754

EMBOSSING MACHINE

Filed Feb. 9, 1922

18 Sheets-Sheet 6

INVENTOR
Clifton Chisholm
By Baker & Macklin
ATTORNEYS

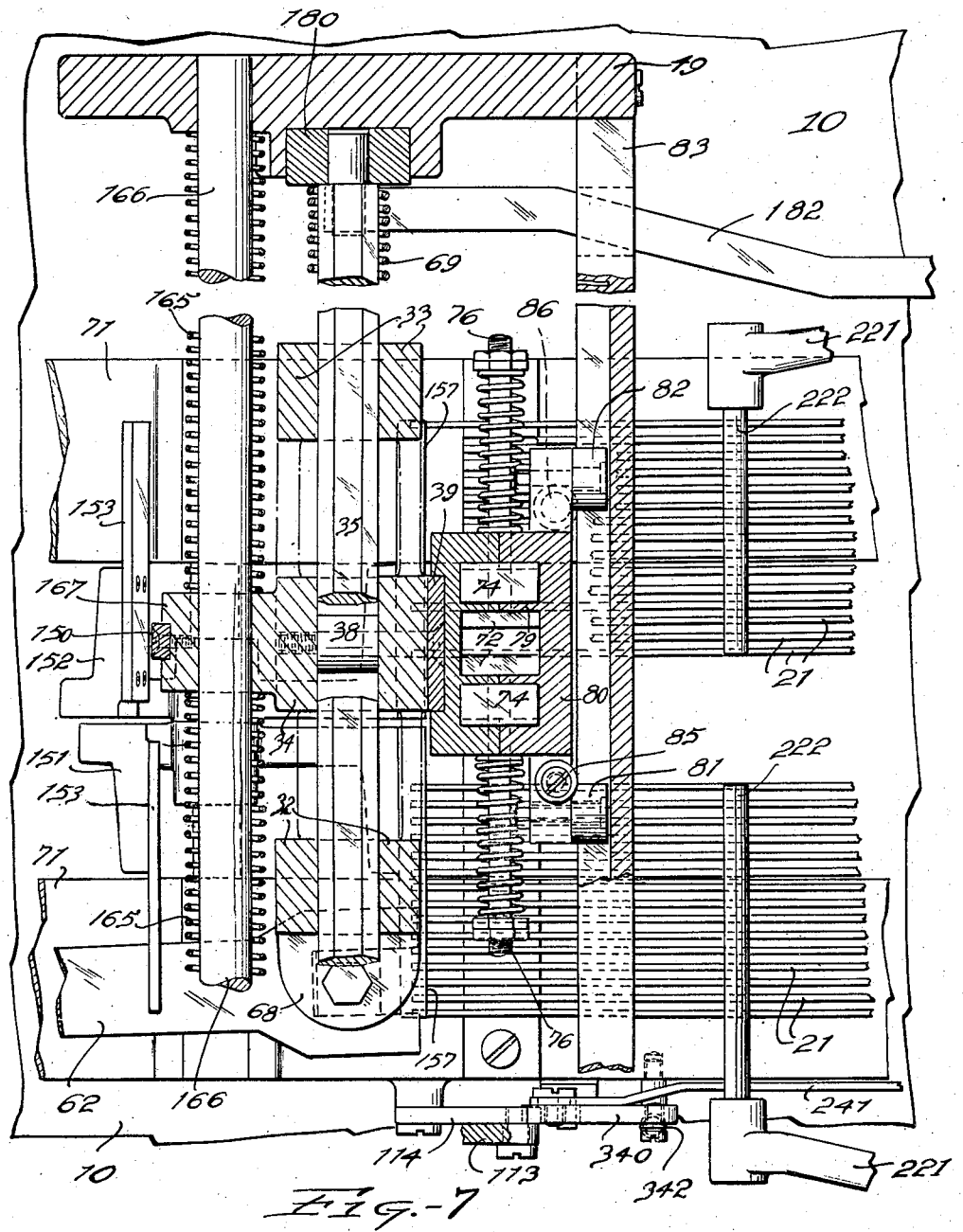

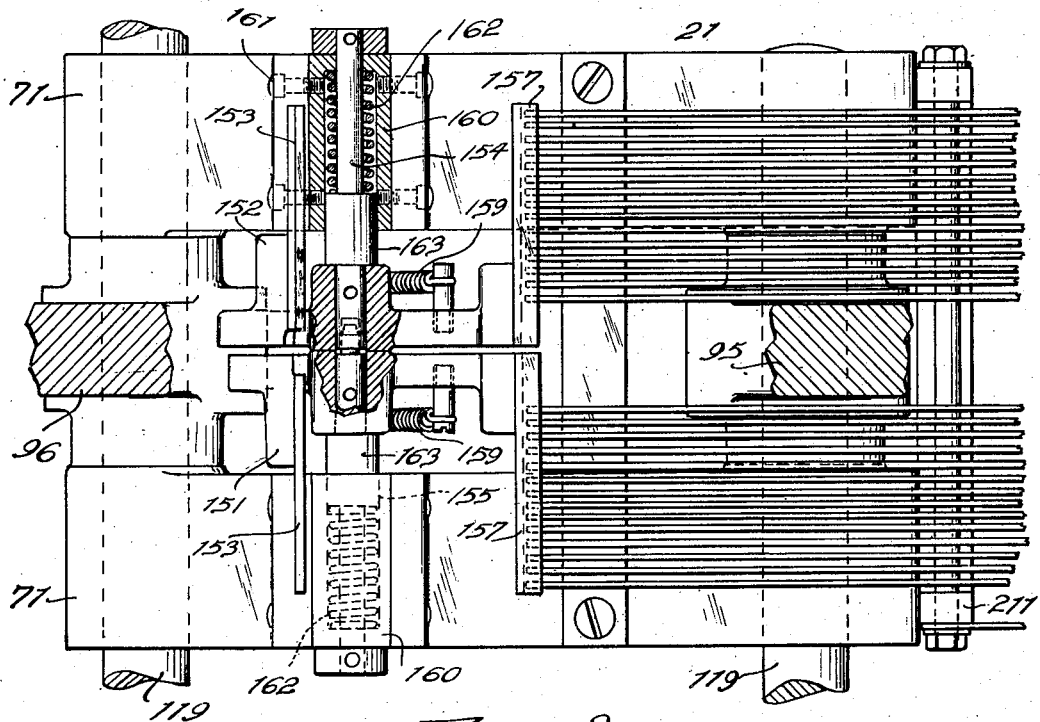

Oct. 20, 1925.

C. CHISHOLM 1,557,754

EMBOSSING MACHINE

Filed Feb. 9, 1922   18 Sheets-Sheet 10

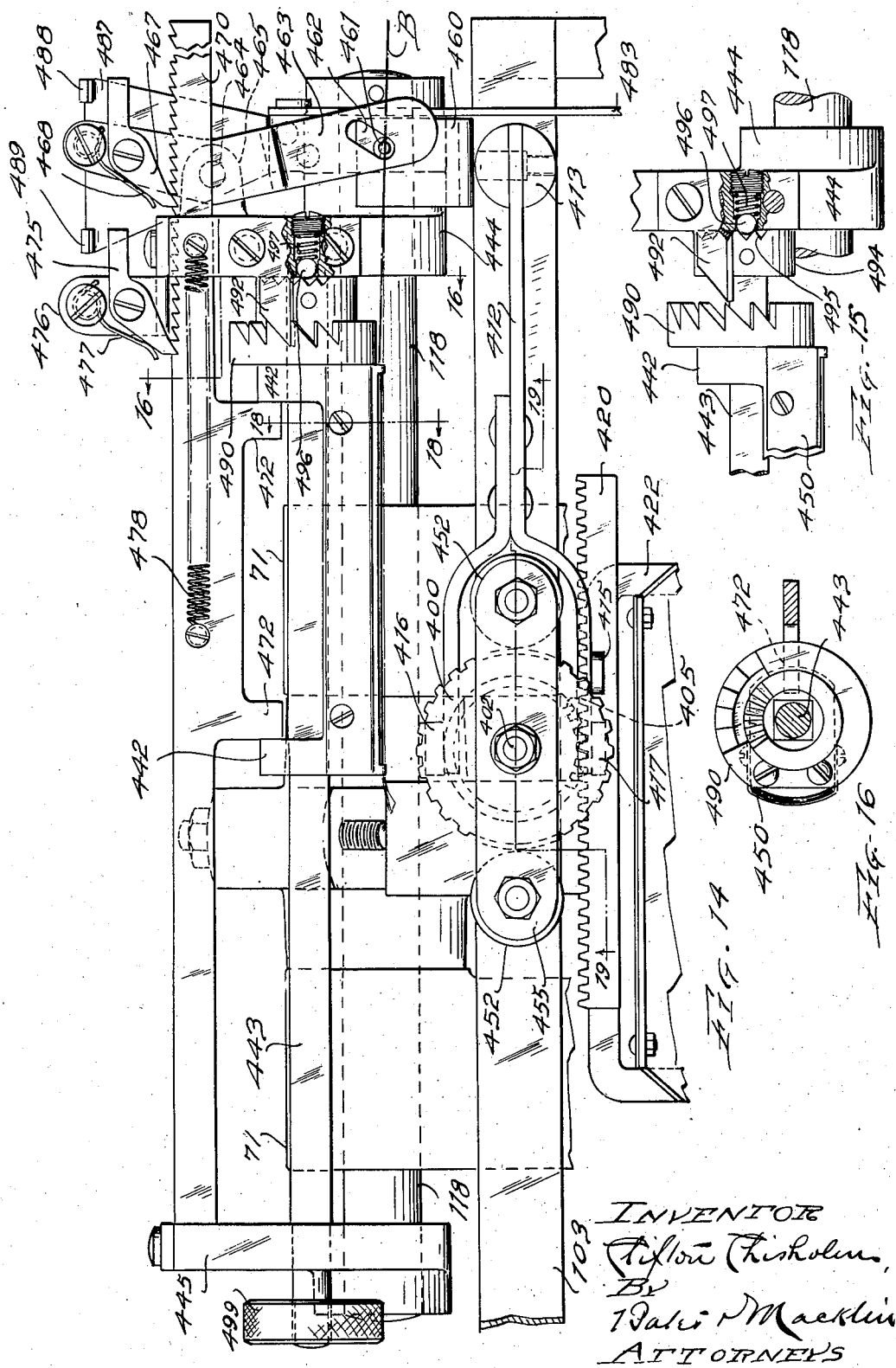

Oct. 20, 1925. 1,557,754
C. CHISHOLM
EMBOSSING MACHINE
Filed Feb. 9, 1922 18 Sheets-Sheet 12
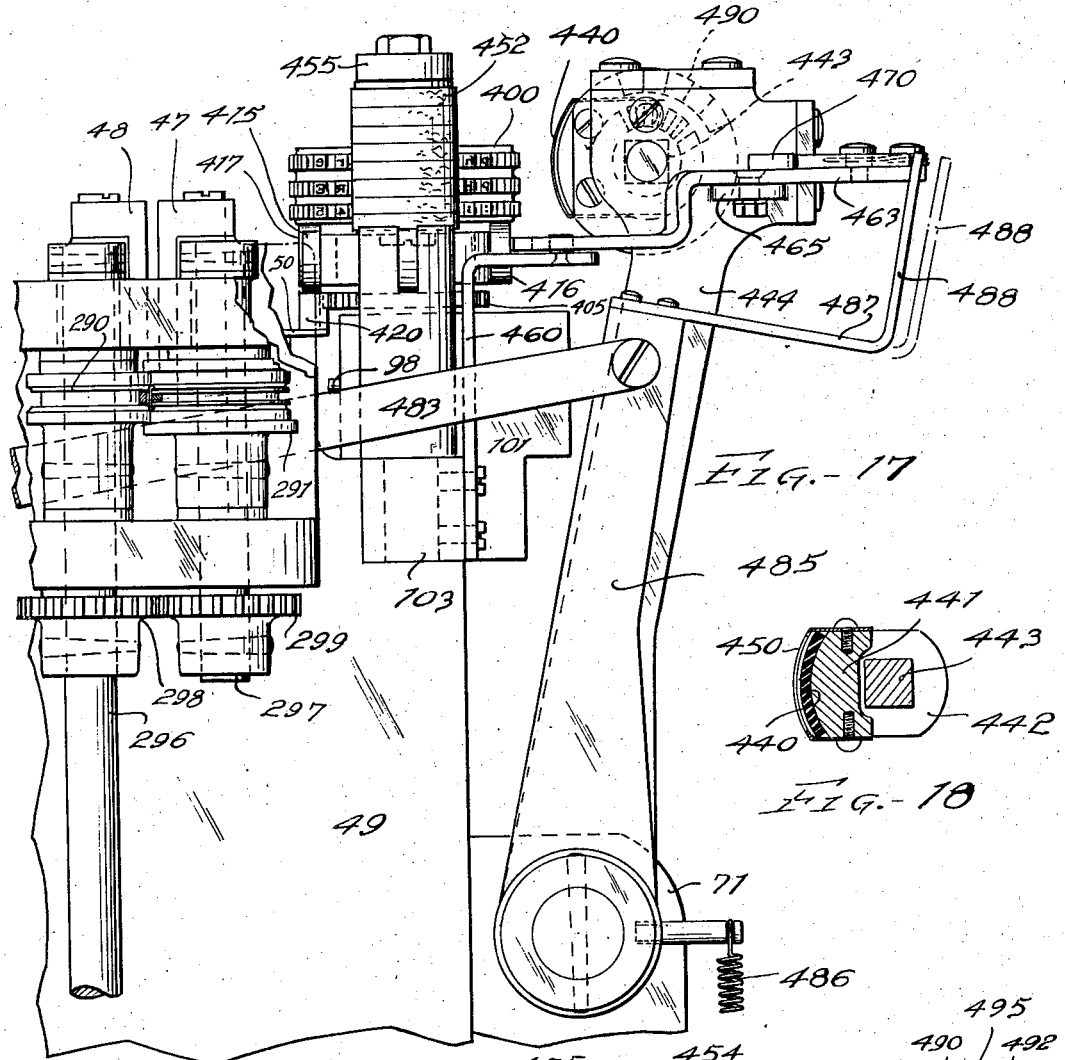
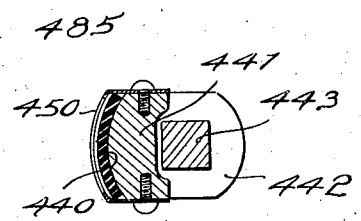
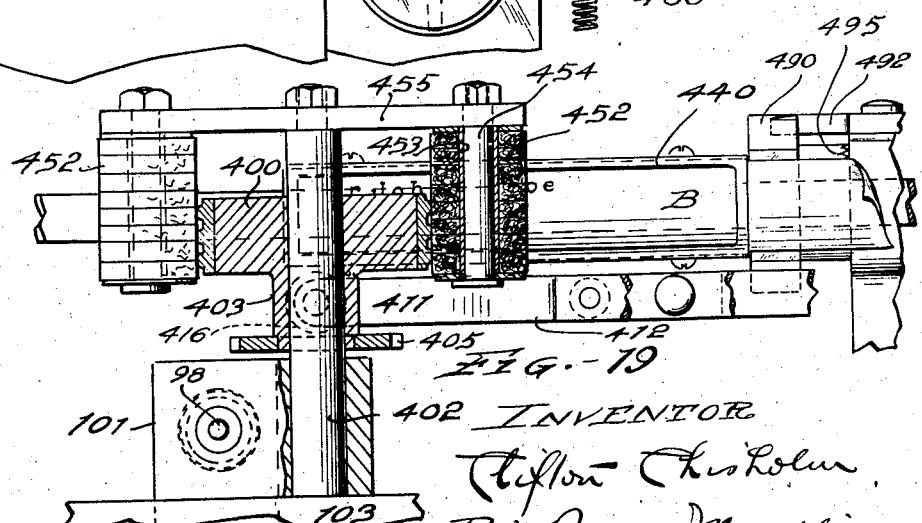

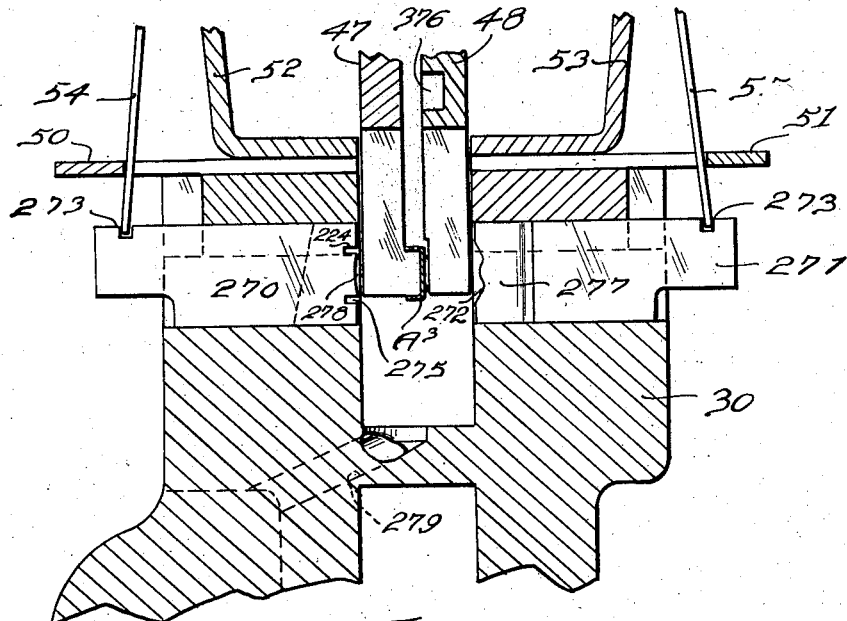
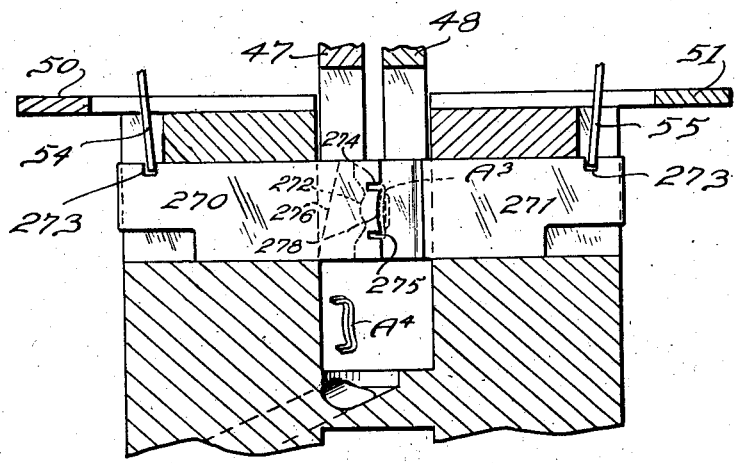
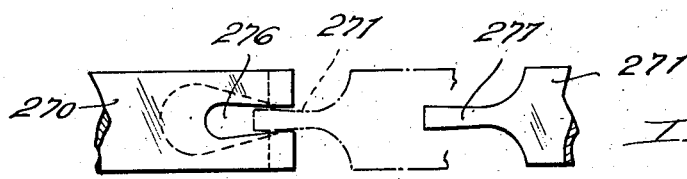

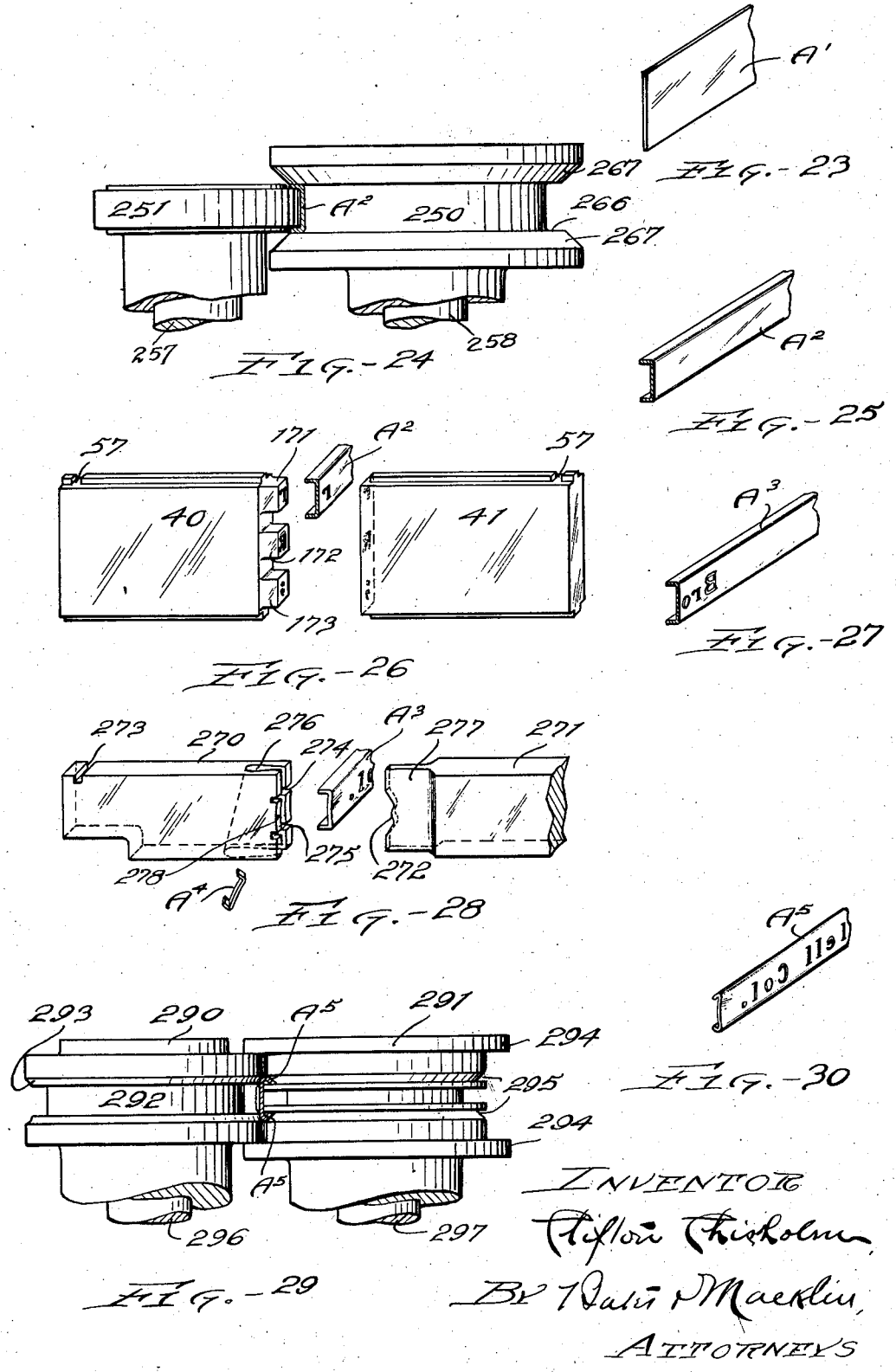

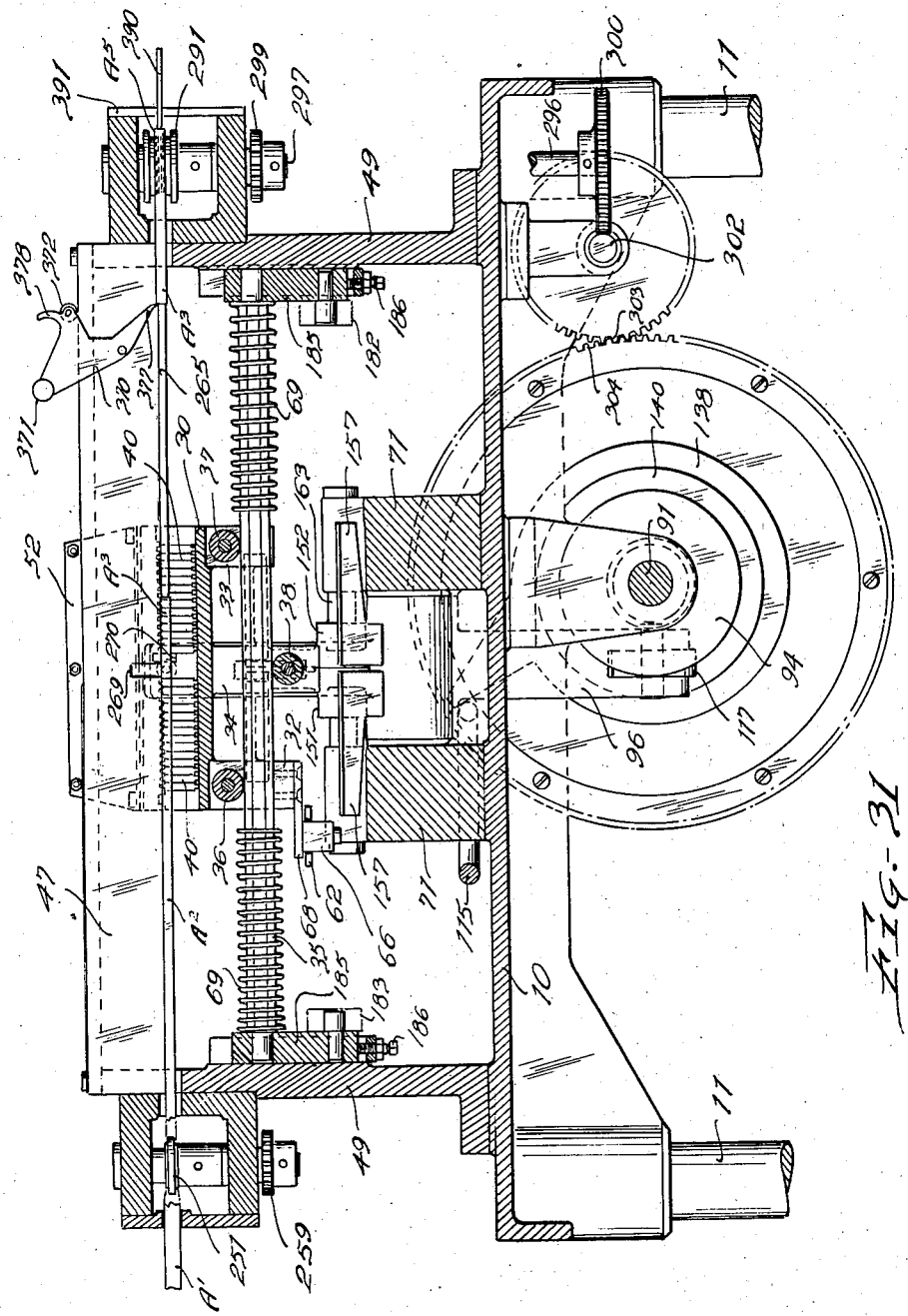

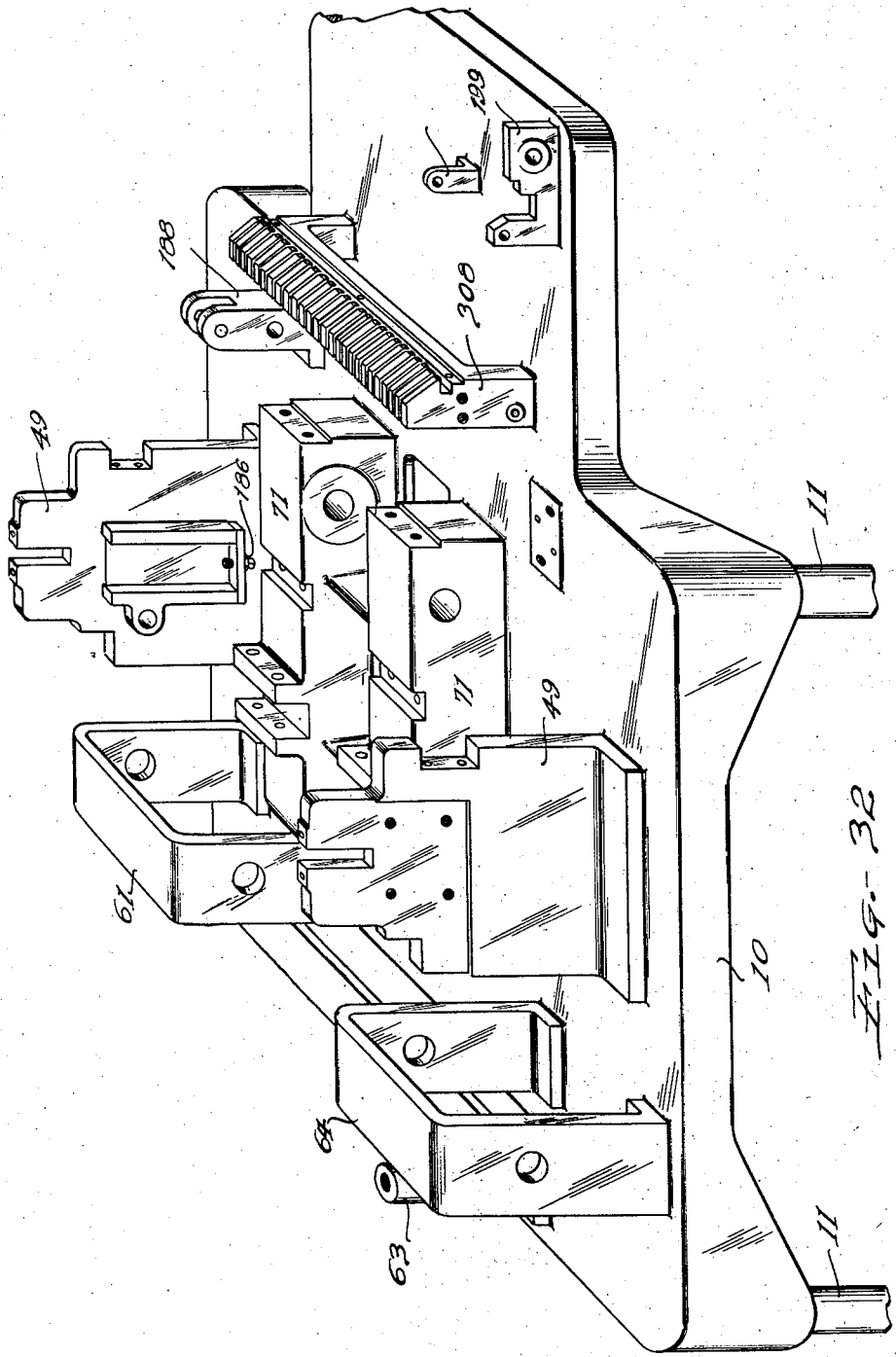

Oct. 20, 1925.
C. CHISHOLM
1,557,754
EMBOSSING MACHINE
Filed Feb. 9, 1922
18 Sheets-Sheet 17
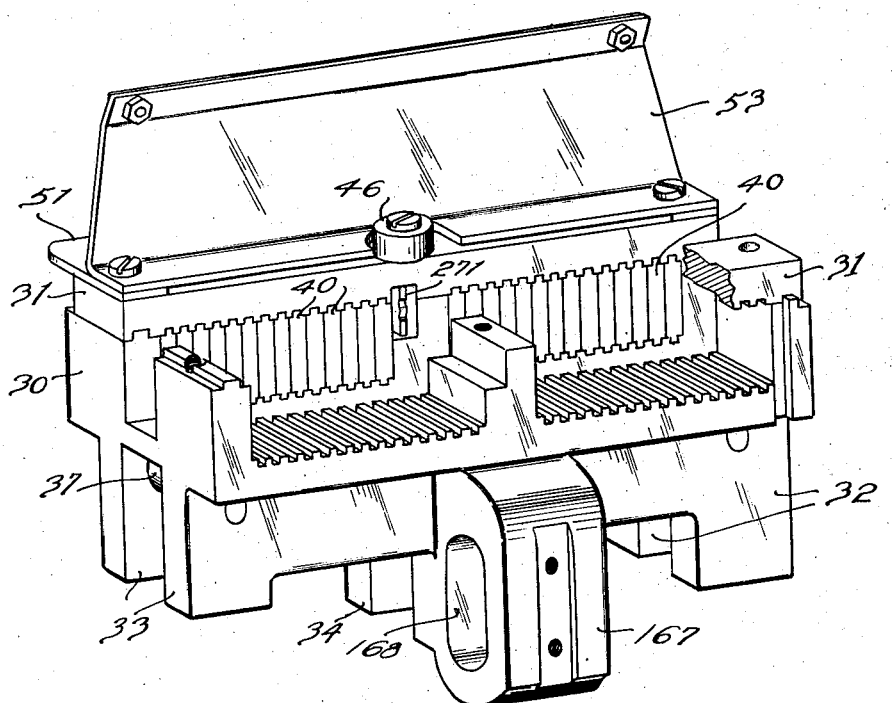
INVENTOR
Clifton Chisholm
BY
ATTORNEYS Oct. 20, 1925.

C. CHISHOLM

EMBOSSING MACHINE

Filed Feb. 9, 1922

1,557,754

18 Sheets-Sheet 18

INVENTOR
Clifton Chisholm
By Bates & Macklin
ATTORNEYS

Patented Oct. 20, 1925.

1,557,754

UNITED STATES PATENT OFFICE.

CLIFTON CHISHOLM, OF CLEVELAND, OHIO, ASSIGNOR TO THE AMERICAN MULTIGRAPH COMPANY, OF CLEVELAND, OHIO, A CORPORATION OF OHIO.

EMBOSSING MACHINE.

Application filed February 9, 1922. Serial No. 535,311.

*To all whom it may concern:*

Be it known that I, CLIFTON CHISHOLM, a citizen of the United States, residing at Cleveland, in the county of Cuyahoga and State of Ohio, have invented certain new and useful Improvements in Embossing Machines, of which the following is a full, clear, and exact description, reference being had to the accompanying drawings.

This invention relates to a method of and apparatus for producing embossed printing strips. The method is concerned with production of such a strip which has flanged edges so that it may be mounted on a suitable holder. My invention includes also a strip so produced. The apparatus which may be employed in carrying out this method and producing this strip comprises a keyboard controlled machine for embossing printing characters on a suitable strip or sheet, the object being to provide an efficient mechanism of this character which may be rapidly operated to produce the desired product.

My invention includes a reciprocable carrier or die head carrying male and female dies with different characters, a keyboard having keys corresponding to the die characters and suitable intermediate mechanisms, whereby upon the actuation of any key the die head is moved to bring the corresponding dies to the embossing position and thereafter the embossing operation follows automatically.

In its preferred form, my machine includes also means for feeding a ribbon of metal from a roll thereof and automatically flanging the edges thereof to give it a channel shape, and then to bring it into position between the embossing dies and after the flanged strip is embossed to shear it into selective lengths and to bend inwardly the edges of the strip, whereby lines are produced suitable for mounting on a holder, as for example, an address printing device.

I prefer to effect the reciprocation of the die head by electro-magnetic action controlled by the keys, there being preferably two magnets adapted to move the die head from a central position in opposite directions respectively, the depression of half of the keys serving to energize one magnet, and the depression of the other half to energize the other magnet.

Another feature of my invention is the combination with the keyboard and embossing mechanism, of printing mechanism adapted to print on a record characters corresponding to those embossed, such printing action being preferably visible during the operation.

My invention includes, in addition to the above, numerous features contributing to the operation of the complete machine, all of which will be hereinafter more fully explained in connection with the drawings, which illustrate a preferred embodiment of the invention. I will now describe such embodiment under the following headings:

Drawings.
General arrangement.
Die head and lateral travel thereof.
Die head latches, clutch release and embossing action.
Clutch.
Die head center lock and shock absorbers.
Keyboard and die head vertical shift.
Electro-magnetic switches and circuits.
Feeding and forming metal strip.
Shearing embossed strip.
Key lever locks.
Strip discharge.
Printing mechanism.
Summary of operations.

*Drawings.*

Figure 2:
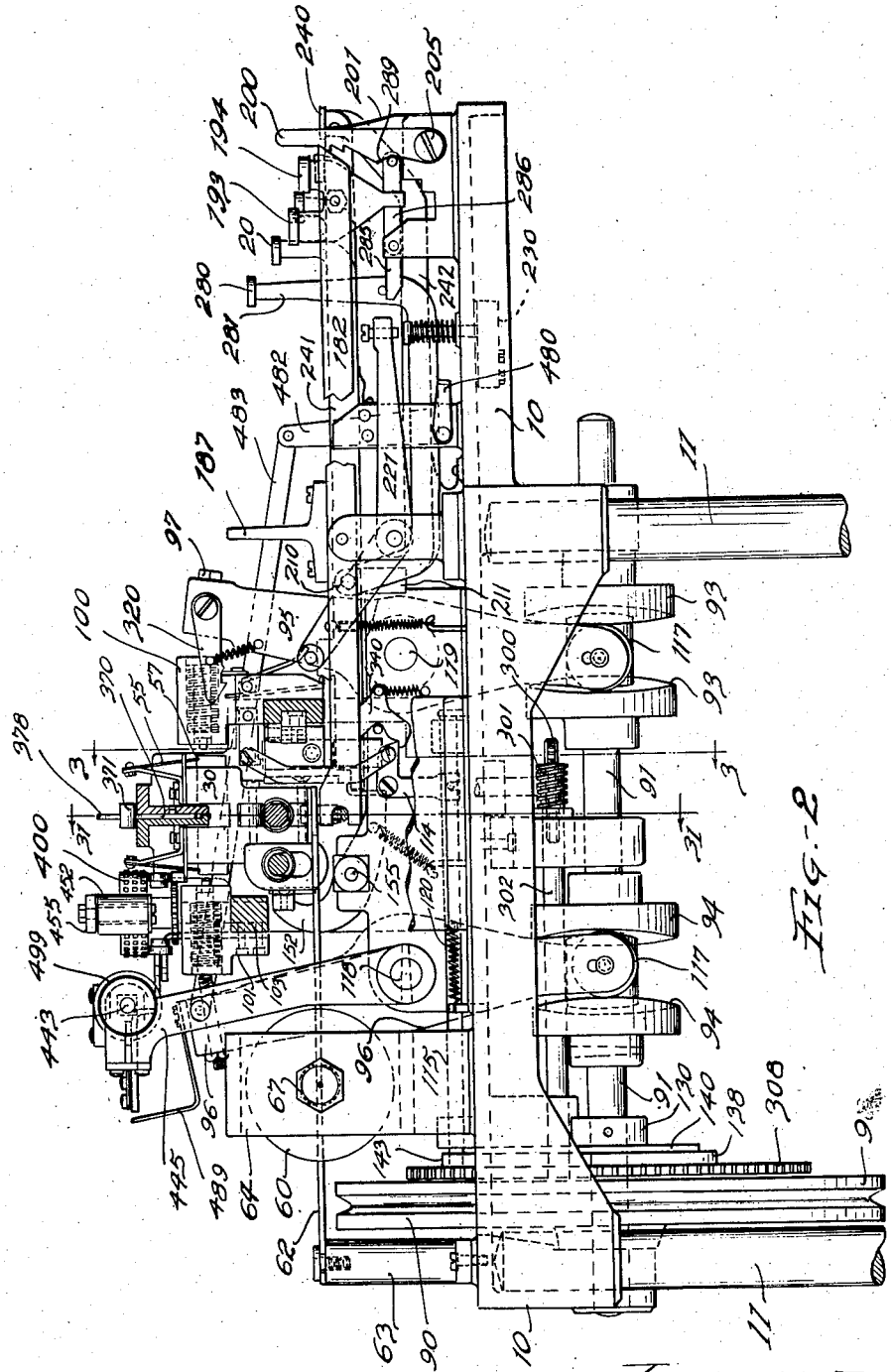
Figure 6:
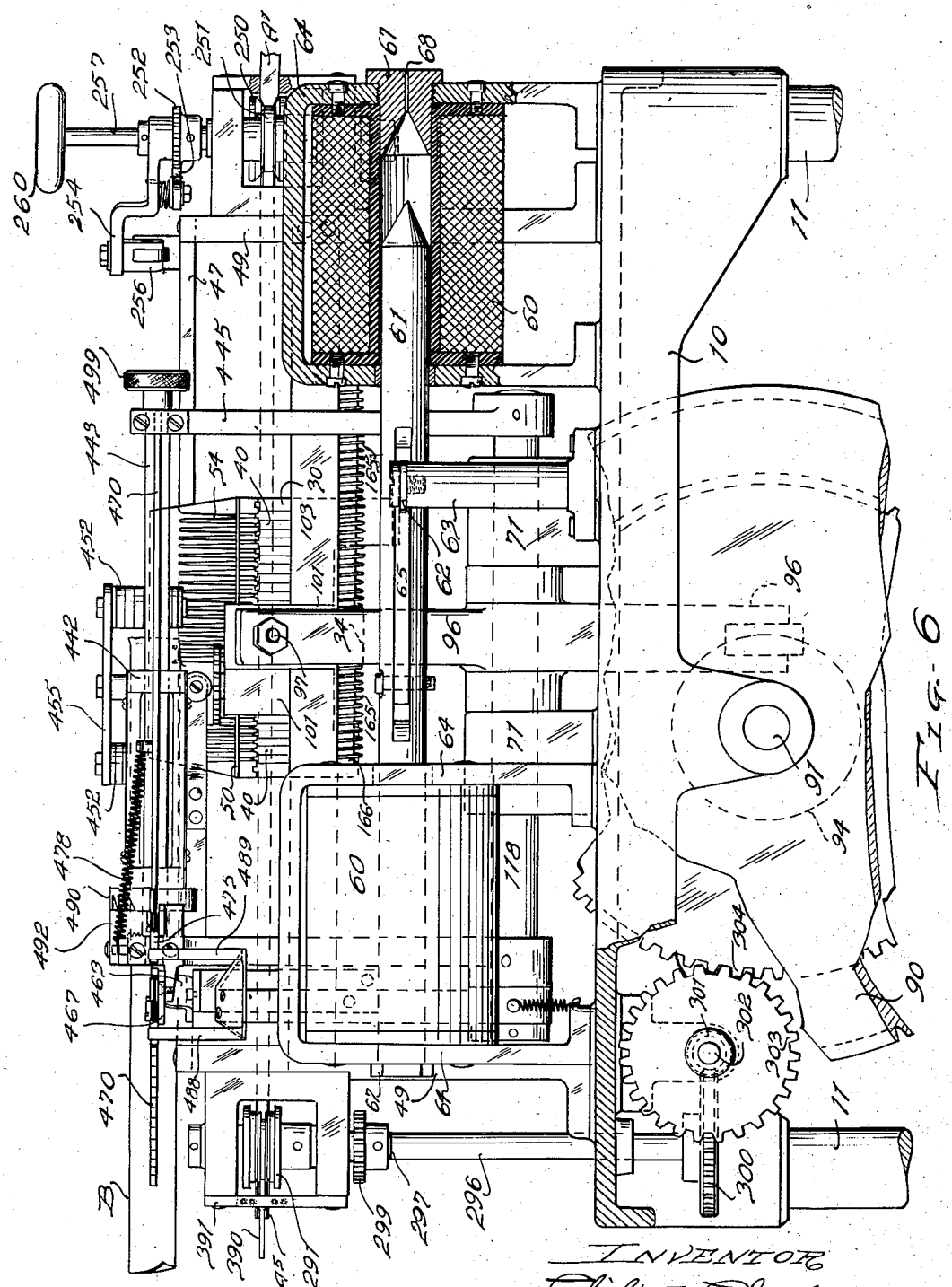
Figure 10:
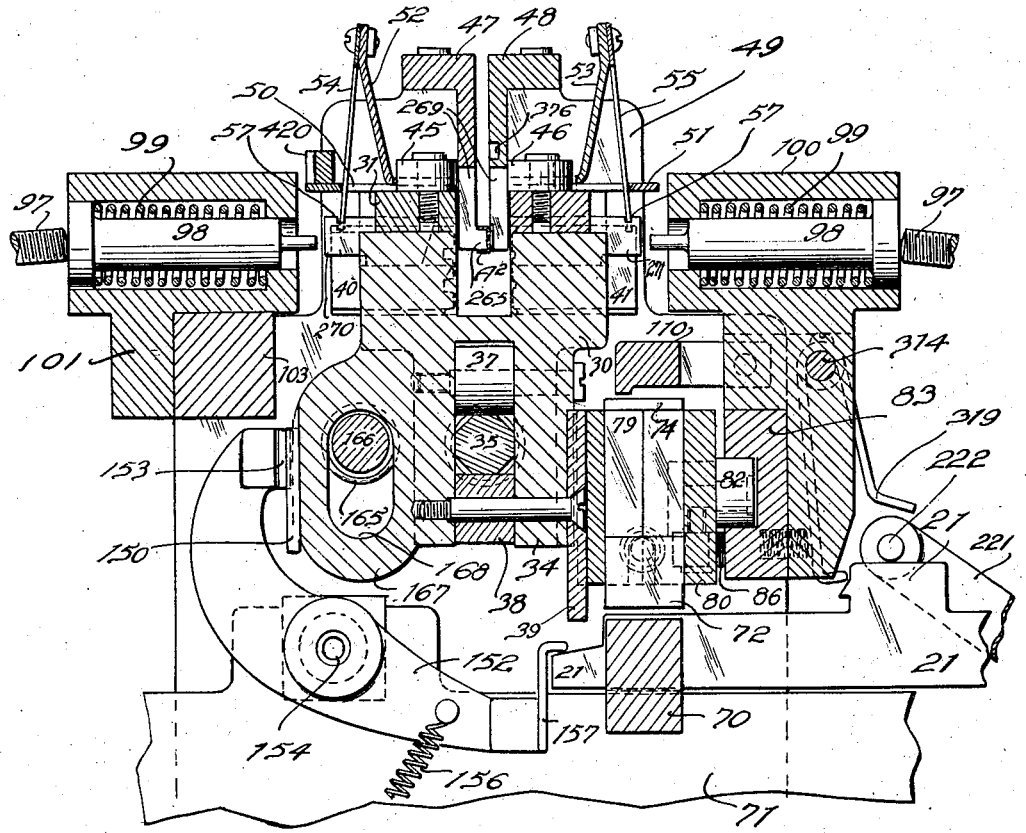

Fig. 1 is a plan with the machine partly broken away; Fig. 2 is a side elevation thereof partly in section; Fig. 3 is a vertical section on the line 3—3 of Fig. 2 looking toward the rear of the machine; Fig. 4 is a vertical section on a larger scale than Fig. 3 and in a plane parallel therewith and slightly in the rear thereof; Fig. 5 is a vertical section fore-and-aft of the machine as indicated by the line 5—5 on Fig. 1; Fig. 6 is a rear elevation, partly broken away; Fig. 7 is a sectional plan indicated by the line 7—7 on Fig. 5; Fig. 8 is a sectional plan on the line 8—8 of Fig. 5; Fig. 9 is a vertical section through a portion of the bank of keys, as indicated by the line 9—9 in Fig. 1; Fig. 10 is a vertical section in a plane parallel with Fig.

Figure 11:
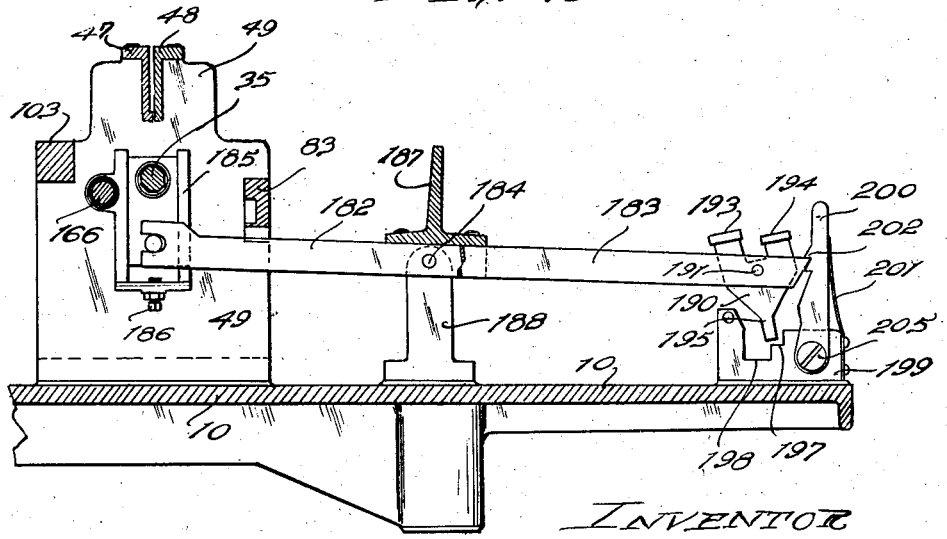
Figure 12:
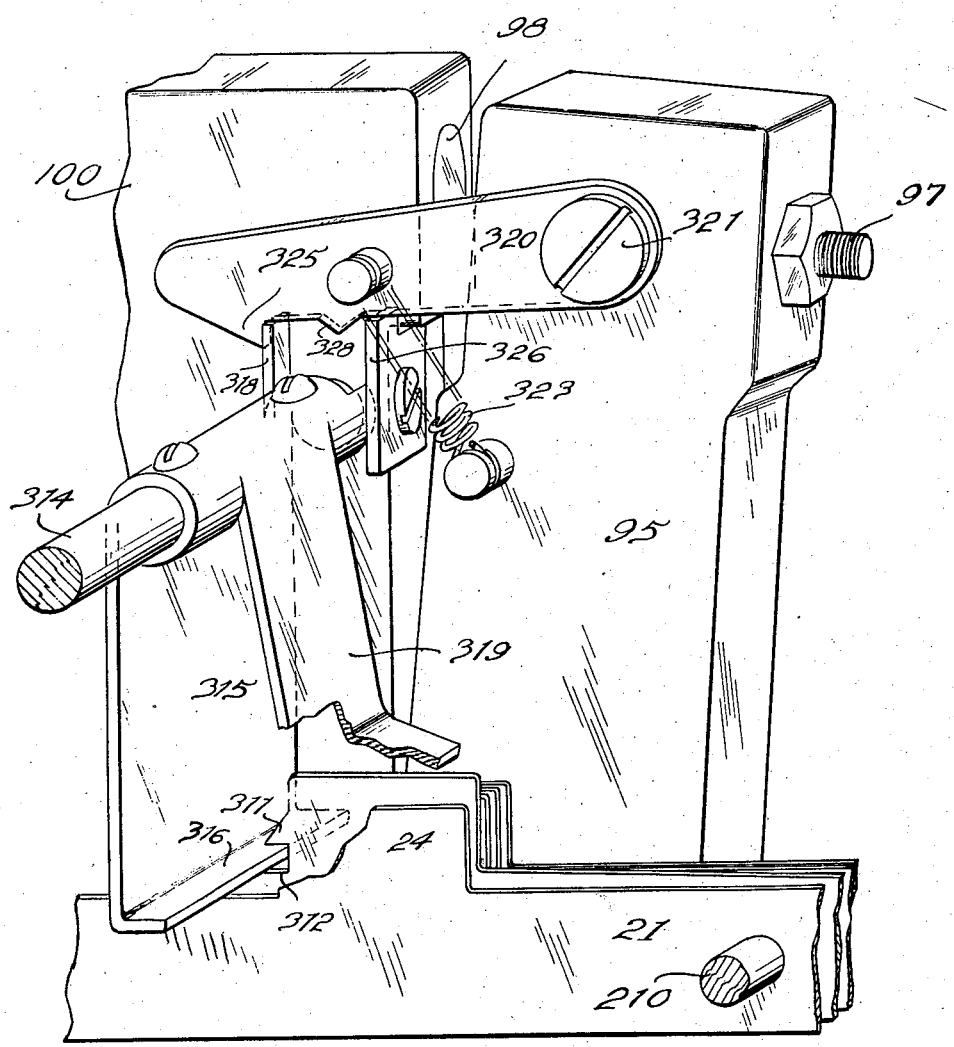
Figure 13:
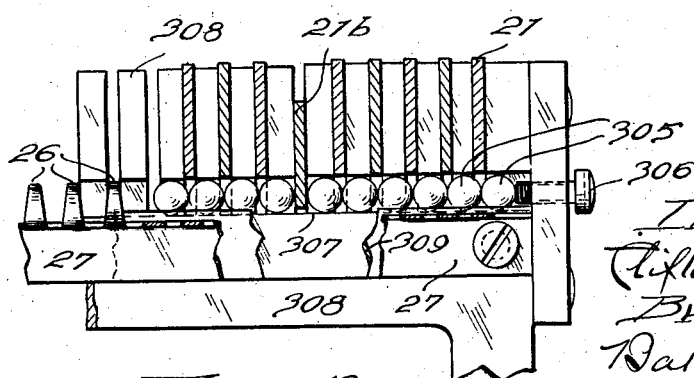
Figure 36:
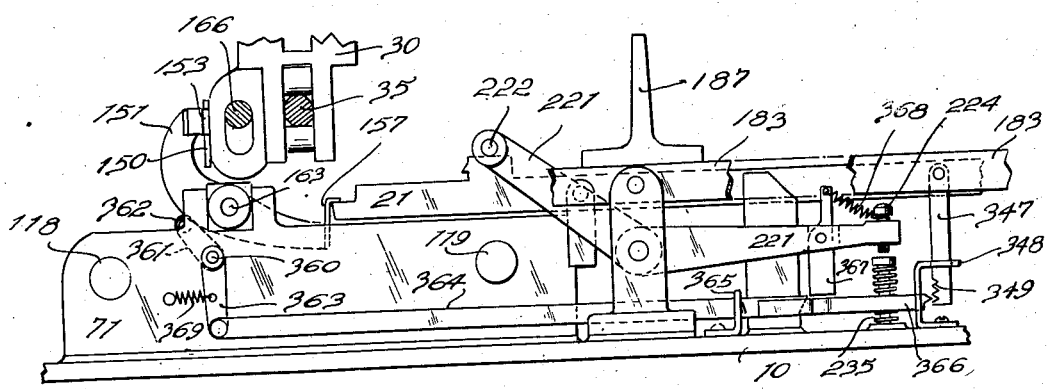
Figure 37:
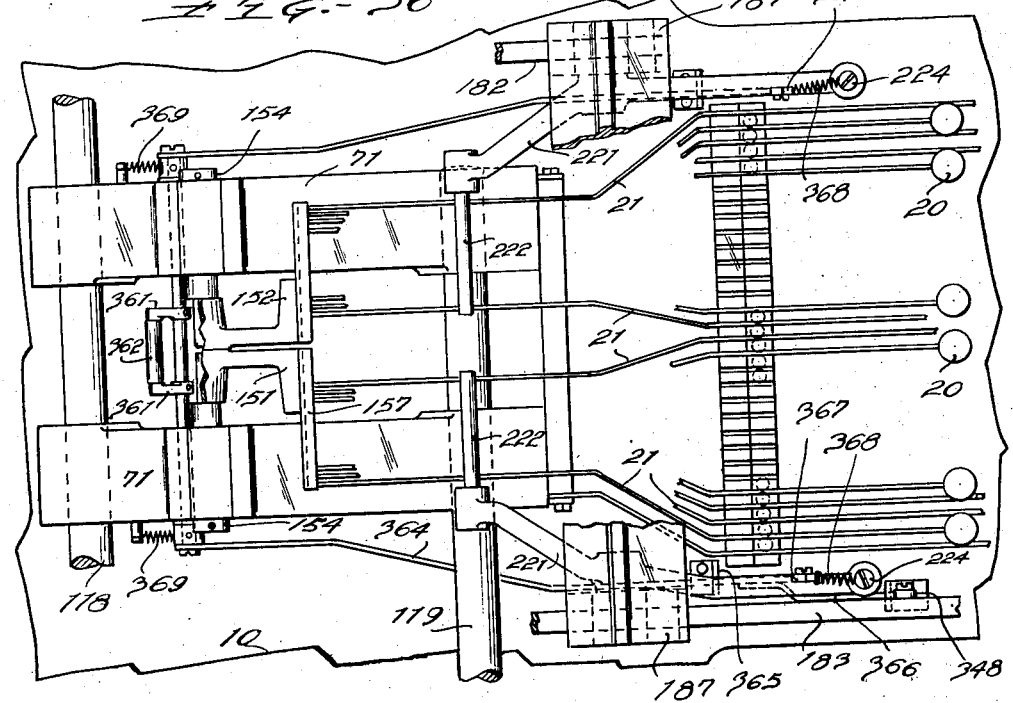
Figure 42:
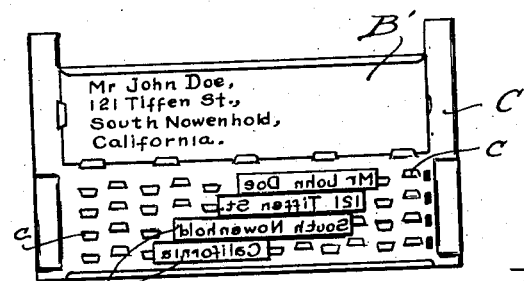

5, being located centrally and extending through the embossing rams as indicated by the line 10—10 on Fig. 1; Fig. 11 is a vertical section illustrating the shift mechanism at the left hand portion of the keyboard; Fig. 12 is an enlarged perspective of the uper portion of the forward ram arm and adjacent parts; Fig. 13 is a transverse vertical section through the mechanism preventing the depression of more than one key at a time, as indicated by the line 13—13 on Fig. 9; Fig. 14 is an enlarged plan view of the printing portion of the machine; Fig. 15 is a detail showing the indexing means for the paper platen in a different position from that shown in Fig. 14; Fig. 16 is a detail of the indexing means, as indicated by the section line 16—16 on Fig. 14. Fig. 17 is a side elevation of the printing mechanism of the machine; Fig. 18 is a section through the paper platen as indicated by the line 18—18 in Fig. 14; Fig. 19 is a vertical sectional view through the printing wheel and its inking mechanism, indicated by the section line 19—19 on Fig. 14; Figs. 20 and 21 are enlarged vertical sections through the die head carrier taken at the shearing dies—Fig. 20 showing the dies retracted and Fig. 21 showing them in engagement; Fig. 22 is a diagrammatic plan showing the relation of the cutting edges of the male and female shearing dies; Fig. 23 is an illustration of the blank strip which the machine forms and embosses; Fig. 24 is a side elevation of the coacting rollers for flanging and feeding the strip; Fig. 25 is a perspective of the strip as flanged; Fig. 26 is a perspective of the embossing dies showing their relation to the flanged strip; Fig. 27 is a perspective of the flanged strip as embossed by these dies; Fig. 28 is a perspective, illustrating the shearing dies and showing their operation on the embossed flanged strip; Fig. 29 is a side elevation of the discharge rollers which also curl the edges of the embossed flanged strip; Fig. 30 is a perspective of the complete strip after leaving the discharge rollers; Fig. 31 is a vertical transverse section of the machine in a plane passing through the die head, as indicated by the line 31—31 in Fig. 2; Fig. 32 is a perspective of the bed plate and its attached brackets and standards; Fig. 33 is a perspective of the die head looking from the rear; Fig. 34 is a sectional detail illustrating the eccentric mounting of the shift lever latch; Fig. 35 is a detail in plan of the manually-operated device for discharging the embossed strip; Fig. 36 is a side elevation illustrating a mechanism which may be employed to prevent depression of any key before the die head has returned to central position; Fig. 37 is a plan of the mechanism shown in Fig. 36. Fig. 38 (Sheet 3) is a detail of a single revolution clutch which may be employed in effecting the operation of the ram arms; Fig. 39 (Sheet 3) is a vertical section through the clutch as indicated by the line 39—39 on Fig. 38; Fig. 40 (Sheet 4) is a vertical section of the die positioning latches; Fig. 41 (Sheet 5) is a detail illustrating the relative position of the strip being embossed and the dies as indicated by the section line 41—41 on Fig. 5; Fig. 42 (Sheet 18) is a view of an address plate holder carrying address strips and record card made by this machine.

*General arrangement.*

The frame of my machine is shown as consisting primarily of a horizontal bed plate 11, (Figs. 1, 2, 3 and 32) mounted on suitable legs 11. Numerous standards or brackets are mounted on this bed plate, as will be described hereinafter in connection with the particular mechanisms they carry.

Referring briefly to the general arrangement of the more important mechanisms of the machine, the keyboard 20, Fig. 1, is located at the front of the machine above an extension 13 of the bed plate, this keyboard consisting of suitable finger pieces and rearwardly extending levers 21, as hereinafter described. At the rear of the key levers is the reciprocating die head 30, mounted to move laterally in either direction from a central postion, and carrying die blocks in co-operating pairs slidable toward and from each other, and having respectively male and female dies on their adjacent ends.

Near the end of the machine are two solenoid magnets 60 which operate a core bar 61 to move the die head by linkage hereinafter described. The actuation of the key levers energizes one or other of the solenoid magnets, by means hereinafter described, to operate the core bar to shift the die head, and the raised rear ends of the key levers serve as stops for the die head, whereby it is caused to assume a position which will bring dies, corresponding to the character key depressed, into the embossing position, which is the center of the machine.

The die head becomes automatically locked in its selected position, and the positioned dies are forced toward each other to emboss an intermediate strip by means of levers 95 and 96, Fig. 2, which are operated by cams 93 and 94 on a shaft 91, the operation of this shaft being automatically initiated when the die head comes to position,—the positioning of the die head releasing a clutch which gives one rotation to the shaft 91. The material to be embossed is preferably a strip supplied as a coiled ribbon in a reel 248, Fig. 1, and fed from this reel on edge transversely of the machine by feed rolls, indicated at 250 and 251. These same rolls bring the ribbon into a channel shape, as hereinafter described, and after the embossing, this strip is sheared by the actuation of a suitable key and is formed into final shape by the discharge rolls 290 and 291.

At the rear of the die head is the printing mechanism, indicated by the type wheel 400 and its platen 440. The type wheel is geared with the die head so that it presents to its platen a character corresponding to the character of the die head presents to the embossing bars. Combined with the platen is the reciprocating paper carriage and the mechanism is coupled with the shearing key in such a manner that the actuation of that key at the completion of a line returns the carriage laterally and turns the platen to present a fresh portion of the paper to the type wheel.

The keyboard is preferably of the shift key type, wherein each key corresponds to a plurality of characters. Each die block has a vertical row all of the characters corresponding to a particular key, and the same is true of the type wheel, and an actuation of the shift key raises or lowers the die head and type wheel simultaneously to bring the selected rank of characters into action. Suitable means are provided to prevent the depression of more than one key at a time, and also to hold a key once depressed down until the completion of the cycle of operation—initiated by it.

*Die head and lateral travel thereof.*

I will first describe in detail the die head and its method of operation. This die head 30 is shown in perspective in Fig. 33; in front view in Fig. 4, and in end elevation in Fig. 5. It consists of a suitably recessed casting having an upwardly bifurcated body and downwardly bifurcated legs, and a top plate 31 secured to the body and providing between them slideways for the die blocks 40, 41. These die blocks are of the character shown in Fig. 26 and are arranged in facing pairs, one carrying male characters and the other female characters; the male characters operating within the channel of the flanged strip $A^2$ being embossed, as shown in this figure.

The die head has downwardly extending bifurcated end legs 32 and 33 and central leg 34 which straddle a supporting bar 35, shown as of octagonal shape. The die head is mounted on this bar by means of rollers 36 and 37 resting on the upper surface of the bar and a roller 38 bearing against its lower surface. The rollers 36 and 37 are mounted within the legs 32 and 33 respectively, while the roller 38 is mounted within the central leg 34. Above the bar 35 the die head carries rollers 45 and 46 riding respectively against the rear and front vertical faces of the frame bars 47 and 48, these bars extending transversely across the machine and mounted on standards 49 rising from the bed plate 10. Secured to the top plate 31 of the die head are a pair of bracket plates 52 and 53 which carry comb springs 54 and 55, the fingers of which engage in notches 57 in the die blocks. These spring fingers are limited in their outward movement by the yokes or bales 50 and 51 which are held on the top plate 31 by the bracket plates 52 and 53 surmounting them and the screws 58 passing through the bracket plates and yokes.

I have referred to the fact that the die head is shifted by means of the solenoids 60 operating through the core bar 61. The connection between the core bar and die head is shown as comprising a lever 62 pivoted to a standard 63 at its rear end and at its forward end connected with the die head, this lever being intermediately connected with the core bar by a link 65. The forward end of this lever 62 is bifurcated and straddles a vertical roller 66 mounted on a stud secured to an extension 39 of the leg 32 of the die head. The effect of this mechanism is that when either magnet is energized, the die head is drawn in the corresponding direction. The depression of any key in the right hand half of the keyboard closes a switch (as later described) energizing the right hand solenoid; the keys on the left hand half energize the left hand solenoid.

The solenoids 60 are shown as mounted in inverted stirrups 64 secured to the bed 10. The end of the core bar may be conical and there may be a reversely conical iron plug 67 (Fig. 6) in the core of the solenoid to increase the magnetic action. A hole 68 through this plug reduces the dash pot action.

To prevent the action of the solenoid from being too sudden and giving a jar to the die head, I provide buffer springs 69 which surround the rod 35 and bear at their outer ends against the members that carry that rod and at their inner ends are adapted to be engaged by the die head legs 32 or 33, as the case may be.

I have mentioned that I employ the rear ends of the key levers 21 as stops to position the die head. These rear end portions, shown in Fig. 4 in vertical section, are guided in a stationary vertically slotted bar 70 secured to a casting 71 mounted on the bed plate 10. When a key is depressed, the rear end of the lever becomes elevated, as shown in the case of the lever $21^a$ in Fig. 4. In such elevated position, the lever coacts with the latches carried by the die head, which will now be described.

*Die head latches, clutch release and embossing action.*

There are two die head latches, one for each half of the keyboard, these latches being mounted in a carriage 80 which travels laterally with the die head. Each latch comprises an abutment 72 (Figs. 4 and 40) yieldingly carried and a vertically slidable latch bar 74 which has an inclined lower face 75, the latch bars being mounted in vertical recesses between the end walls of the carriage and partitions 79 therein the distance between the proximate face of the abutment and latch bar being slightly greater than the width of the key lever. When the rear end of the key lever is elevated, as shown at 21$^a$ in Fig. 4, the depression of the key which causes this elevation energizes the solenoid on that side of the machine to draw the die head toward such raised key lever so that the beveled end 75 of the corresponding latch bar engages the key lever and rides up over it, and the die head is brought to rest by the abutment 72 engaging the side of the key lever. At the same time the latch bar 74, dropping by gravity, passes on the opposite side of the key lever, thereby locking the die head to the key lever.

The abutment 72 is resiliently carried by the die head to take up the shock of the stop. As shown, this abutment is a depending lug on a bar 76 slidable in the die head and carrying at its outer end a nut 77. A compression spring 78 surrounds the rod and becomes compressed between the die head and the nut.

The carriage 80 in which the latches referred to are mounted travels laterally with the die head, and is formed, as shown in Figs. 7 and 10, to embrace a hardened plate 39 on the intermediate leg 34 of the die head. This carriage is supported by rollers 81 and 82 which ride in a groove in a stationary rail 83 which is secured at its ends to the side frame members 49. This carriage also has a pair of staggered rollers 85 and 86 which ride respectively on the upper and lower portions of the inner face of the rail 83. These latter rolls also serve to maintain the carriage in engagement with the die head. The carriage thus moves laterally in unison with the die head and the stopping of the carriage stops the die head, as before explained.

From the above description, it will be seen that whenever a key is depressed the energization of the solenoid caused thereby, brings the die head into position where it is locked by being latched to the raised rear ends of the key lever. Then the main drive wheel 90, Fig. 2, (shown as grooved to receive power from any suitable source), is loosely mounted and may be automatically clutched by means hereinafter described, to the power shaft 91, thereby operating a pair of cams 93 and 94 which swing levers 95 and 96 to force toward each other that pair of male and female dies which has been positioned in the central vertical plane between the upper ends of the levers. These levers 95 and 96 carry adjustable screws 97 to limit their effective throw and these screws engage rams 98 (Fig. 10) which are surrounded and stationarily held in idle position by springs 99, the rams and springs being mounted in stationary housings 100 and 101. The housing 100 is secured to the rail 83 heretofore described, while the housing 101 is secured to the cross bar 103 secured at its end to the same frame standards 49.

It will now be seen that the depression of a key results first in positioning the corresponding male and female dies on opposite sides of the strip to be embossed, and then in the actuation of the rams to force these two dies toward each other to emboss the strip. The actuation of the rams, in the mechanism shown, is initiated through the upward movement of the latch bar 74 just as the die comes into position, as will now be described with references to Figs. 1, 4, 5 and 10.

When the latch bar 74 rises, its upper end abuts the horizontal pivoted bale 110 which is pivoted to lugs 111 mounted on the rail 83. This bale is connected by a link 113 to a bell crank 114, the depending arm of which engages a shipper rod 115 which controls in a single revolution clutch indicated at 130, 140, 143 in Fig. 2. This clutch, (to be hereinafter specifically described) when released, connects the main driving wheel 90 with the shaft 91. This shaft, as stated, carries the cams 93 and 94 which, as shown in Fig. 2, are preferably each double crown cams. Within the groove of these cams ride rollers 117 which are on the lower end of the embossing levers 95 and 96. These levers are intermediately supported on rocker shafts 118 and 119, to which they are pinned. These shafts are journaled in bearing ears forming a portion of the frame casting 71, heretofore mentioned.

At the end of one rotation of the shaft 91 the clutch automatically disengages itself and the rotation stops, and as soon as the key lever returns to normal position, the springs 69 and other springs hereinafter mentioned return the die head to normal position ready for the succeeding operation. Suitable mechanism, hereinafter described, is provided to prevent the return of a key once depressed until after the cycle of operation has been completed.

The rod 115 which normally holds the clutch inactive is maintained in such holding position by a spring 120 which engages the bar and draws it toward the rear. When the latch 74 is raised by engagement with the elevated rear end of the key lever it acts to draw the bar 15 forwardly sufficient to release the clutch, but immediately after such release the latch drops and the spring returns the bar to normal position to engage the clutch shoulder and withdraw it from action at the end of the rotation.

Clutch.

The clutch may be of any suitable form provided it has the single-rotation characteristic. Figs. 38 and 39 show in clutched condition a clutch of the Horton type. This comprises a disc-like clutch member 130 pinned to the shaft 91 and a set of rollers 131 riding in tangential notches in this member 130 and adapted to coact with an annular member 133 secured to the driving wheel 90. Springs 135 tend to seat the rollers 131 in engagement with both the members 130 and 133. The rollers are normally held out of such engagement by rollers 136 which are mounted on pins 137 carried by a disc-like member 138 which surrounds a shoulder 139 on the member 130.

The operating member 138 is held in place by a washer 140 secured to the member 130. Spring 142 anchored at one end to the member 130 and at the other end to the member 138 tends to draw the latter into position to free the rollers 131, allowing the springs 135 to seat these rollers and set the clutch. The member 138, however, has a projecting arm 143 which is adapted to engage the rod 115, whereby the member is held with the spring 142 constrained and the rollers 136 in engagement with the rollers 131, holding them in idle position, the spring 142 not being strong enough to turn the shaft.

Fig. 38 represents the clutch just before it completes its rotation, the power wheel 90 being clutched to the shaft 91, but immediately upon the engagement of the clutch arm 143 with the rod 115, the clutch member 138 will be thereby turned to cause the rollers 136 to free the clutch rollers 131, and thereby disengage the clutch. It will remain disengaged until the next key is operated and the rod 115 withdrawn in consequence. After the arm 143 has released by withdrawal of the rod 115 and the arm has moved out of range of the rod, the latter is returned to position, as heretofore explained, and engages the arm and releases the clutch as the shaft completes its rotation.

Die head, center lock and shock absorbers.

To lock the die head normally in central position, I provide the following mechanism referring particularly to Figs. 5, 7, 8 and 10. On the rear of the die head is a hardened gib 150. Behind and beneath the die head and extending longitudinally of the machine are a pair of levers 151 and 152 pivoted on two aligned shafts 154 and 155, and each carrying a horizontal bar 153, there being a central space between the two bars only slightly larger than the width of the gib 150. Springs 158 and 159 tend to swing the upper ends of the levers toward the die head and thus when the die head is centrally located to house the gib within the space between the adjacent end of the bars 153.

Whenever a key is actuated its rear end engages one of the universal bars 157 secured to the lower ends of the respective levers and which overhangs the rear ends of the key levers 21, so that the corresponding bar 153 is swung back out of the way and the die head is free to move in that direction and after action to return to central position. As the cycle of operation is completing, the depressed key returns to normal position and the descending rear end of the key lever, releases the raised universal bar 157 and the spring 158 or 159 swings the upper end of the corresponding locking lever forward so that the bar 153 which was swung rearwardly returns to normal position, the gib 150 being thus held between the end of the two bars 153. If the bar 153 swings forward before the die head has reached central position the gib simply slides along the same as the die head returns to central position, and when it comes to central position, the space between the bars receives the gib 150 and the bar which was engaged springs forwardly to normal position, so that the gib is embraced within the intervening space and the die head locked in central position.

The shafts 154 and 155 on which the locking levers 151 and 152 are mounted are longitudinally shiftable against the resistance of springs as shown in Fig. 8. These shafts are mounted in housings 160 held in the frame member 71 by set screws 161, and compression springs 162 surround the shafts in the housings and are compressed between the ends of the housing and enlarged portions 163 on the shafts. These enlargements abut the opposite edges of the levers 151 and 152. These springs tend to maintain the levers in central position, but allow them to shift in either direction therefrom as the locking takes place so that the blow is relieved. The springs thereafter immediately center the displaced lever.

To return the die head to the central position whenever it is released and also to take up the shock of its momentum in moving either to or from its central position, I provide several compression springs, first two springs 165 which surround a stationary rod 166 carried by the frame plates 49 and which are compressed against opposite sides of the die carrier extension 167 which carries the gib 150. The rod 166 extends through the slot 168 in the extension so that the extension is free on the bar. These springs 165 act constantly and one or the other of them is increased in compression when the die head moves from the central position and tends to return it to that position.

I have heretofore referred to two compression springs 69 located on the octagonal rod 35 which are preferably uncompressed when the die head is in central position, their inner ends standing some distance away from the opposite ends of the die head. These springs are designed to counteract the increasing force of the solenoid magnets as the end of the core 61 approaches the center of the solenoid. I have also heretofore mentioned the springs 78 which surround the bars 76 carrying the abutments 72 which engage the key levers in stopping the die head in any active position to which it may be moved. I have found that the system of springs described, is effective in bringing the die head to rest without shock and at the same time without interfering with its quick response to energization of the solenoids.

*Keyboard and die head vertical shift.*

Referring now to the keyboard, which is best shown in Figs. 1, 2, 8, 9 and 11: the keyboard illustrated is of the double shift type. That is to say, each key corresponds to three characters, depending on whether the key shift is unapplied or shifted either one or two distances from the normal position, and to enable the employment of such double shift keyboard (thus reducing the number of keys required) I employ dies each of which has three characters corresponding to the three characters represented by the key.

As illustrated in Fig. 26, the male dies 40 have three projections 171, 172 and 173; the upper ones (171) of which carry the lower case character and correspond to what may be called the normal position of the keyboard; the intermediate ones (172) carrying the corresponding upper case characters and responding to the shift of one distance; and the lower ones (173) having the numerals and punctuation points. The corresponding female dies are similarly arranged in the adjacent end of the female die block 41.

To bring the desired one of the three characters on the die into position, the whole die head is automatically raised one or two amounts consequent upon the operation of the key shift. Mechanism for effecting this will now be described.

The octagonal bar 35 on which the die carrier rides is carried at its ends in a pair of vertical slides 180 (Figs. 7, 11, 31) mounted in vertical guideways in the frame members 49. These slides 180 are guided by ribs 185 on the frame plates 49, and the lowermost normal position of the die head is accurately registered by the stop screws 186 also carried by these frame plates. The slides are engaged by a pair of shift levers 182 and 183 (Figs. 1 and 11) which are mounted on a rock shaft 184 carried in frame standards 188. The levers 182, 183 are braced by the transverse bar 187, shown as of inverted T shape, secured to them so that they necessarily operate as a unit. One of these levers 183 extends forwardly of the pivot to a point alongside of the keyboard for convenient actuation.

The lever 183 carries near its forward end a rocking shift dog 190, of approximately Y shape. This dog is pivoted to the lever at 191 and above the pivot carries two finger keys 193 and 194; the depression of either of which rocks the dog in the corresponding direction. The lower end of the dog is adapted to engage either of two steps 197 or 198 on a stationary block 199 according to which key piece 193 or 194 is pressed by the operator; such pressure operating the Y dog into position to engage one or the other of these steps.

The lever 183 when thus actuated is held in either of its depressed positions by a latch 200 pressed toward the lever by a spring 201; the latch having teeth 202 corresponding to the two lower positions of the lever. Normally the lever is in its uppermost position by the weight of the die head. Such condition of the keyboard corresponding to the lower case characters on the upper portion of the die blocks. To change the keyboard from the normal lower case characters to the upper case characters, the key 193 is depressed which brings the parts into position shown in Fig. 11 and presents the characters at the mid-portion of the die blocks to the strip to be embossed. To change to numerals or punctuations, the key 194 is depressed which carries the lever 183 one step further down, raising the die head to present the lower set of dies in active position.

The pivot pin 205 of the latch 200 is eccentrically mounted as shown in Fig. 34 which enables its adjustment. This provides a very convenient means for accurately adjusting the upper positions of the die head vertically with reference to the strip to be embossed.

The keys 20 of the keyboard are shown as rigidly mounted on the upturned forward ends of the flat key levers 21. These levers are pivoted on the cross rod 210 which is mounted at its ends in the lugs 211 (Figs. 1, 5 and 9) on the forward end of the frame casting 71. The key levers are brought toward each other into two groups, as shown in Fig. 1, close to each other forward of the pivot and extending rearwardly therefrom, the rear ends being guided in a stationary comb provided by the bar 70 heretofore mentioned. The key levers are pressed upwardly by light springs, shown in Figs. 9 and 12, as fingers 26 on a comb 27 secured to a frame member 308.

*Electro-magnetic switches and circuits.*

Each of the key levers, besides raising its rear end into position to stop the die head, closes an electric connection to the corresponding solenoid to energize it to shift the die head in that direction. This is effected by the following mechanism, best shown in Figs. 1, 5 and 9.

Pivoted on the rod 220, directly below the shaft 184 (Fig. 9) are a pair of levers 221 each of which carries at it rear end a stub shaft 222 extending over the adjacent half of the key levers, as shown in Fig. 1, (being directly above upward extensions 24 on the key levers), and at its forward end carries an adjusting screw 224 which is adapted to engage and close the switch controlling the corresponding solenoid. Springs at 223, Fig. 5, tend to maintain these levers in the idle position shown in Fig. 9.

As illustrated in Fig. 9 each of the solenoid switches comprises a stationary terminal 230 and a movable terminal 231 both insulatingly carried by the bed plate 10 and connected by insulated wires 232 and 233 with the corresponding solenoid terminals. Resting on the movable terminal 231 but insulated from it is a plunger rod 235 which is slidable through the frame and terminating at its upper end just below the screw 224. A spring 236 tends to elevate this rod and the resilience of the spring terminal 231 keeps the contacts separated.

There being one of the electric switches and circuits described for each solenoid, it results that whenever a key in the right hand half of the keyboard is depressed, the right hand solenoid is energized and the die head is moved toward the right until stopped by engaging the elevated rear end of the key lever depressed. When the key in the left hand of the keyboard is depressed, the reverse action takes place. The set screw 224 allows sufficient space in the depression of the key before the solenoid is energized to insure the rear end of the key being in the path of the die head lock before the head is moved.

In front of the keys is the usual space bar 240. This is mounted on the forward end of a pair of levers 241 and 242 which are pivoted on the rod 210 and extend to the rear thereof but are not high enough at the rear to engage the stub shafts 222 and hence do not operate the solenoid switches,—these two levers having no elevated portions like the portions 24 on the levers 21. The result is that the depression of the space bar causes no operation of the die head, but does initiate the other operations of the machine to cause the feeding of the strip and to effect the printing, both of which will be hereinafter described. This space bar lever accordingly releases the clutch the same as a key lever, but there being no dies opposite the rams 98, the operation of these rams is idle. The space bar lever 242 preferably lies alongside of the key levers 21 and is pressed upwardly by one of the spring fingers 26; the lever 241 extends beneath the comb 308 (for a reason hereinafter stated) and is pressed upwardly by a spring 243, Fig. 9.

*Feeding and forming metal strip.*

I will now describe the feed for the metal ribbon and the means for forming and shearing the strip. This ribbon, designated A' in Figs. 1 and 23, is mounted, as heretofore stated, in a reel 90 located horizontally at the left hand of the machine. The ribbon passes from this reel as a flat strip on edge to a pair of feed rolls 250 and 251, heretofore referred to, which are shown as pinned to short vertical shafts 257 and 258 (Figs. 1 and 24) which are geared together at their lower ends by meshing pinions 259. To provide for starting the strip into the machine, I mount a hand wheel 260 on the upper end of the shaft 257.

The feed roll 250 carries a ratchet wheel 252 with which coacts a pawl 253 on a lever 254. This lever is connected by a link 255 to a rock arm 256 on a rock shaft 119 on which the forward embossing lever 96 is tightly mounted. Accordingly, whenever that embossing lever is operated the arm 254 is given first an idle rear movement and then (as the embossing lever returns) an active forward movement giving the roll 250 a slight rotation and feeding the strip a distance corresponding to that occupied by one character.

It results from the above described mechanism that following the embossing of any character the strip is fed a distance corresponding to the space occupied by one character. Such feed also takes place whenever the space bar 240 is depressed, which, as heretofore explained, operates the embossing lever idly.

The rolls 250 and 251 do more than feed the strip. They also form it into a channel shape. This will be clear from Fig. 24 wherein it will be seen that the roll 250 has a channel shape groove 266 and beveled sides 267 leading thereto, while the roller 251 is a plain cylindrical roll having a width narrower than the width of the groove 266 by a distance substantially equal to twice the thickness of the metal of the strip, and being centrally positioned within the groove 266. The flat ribbon of metal, indicated at A' in Figs. 1 and 23, as it comes from the reel, lies against the chamfered face 267 of the roll 250 and by the coaction of the roll 251 is flanged into the channel shape shown at $A^2$ in Figs. 24 and 25.

In the channel shape form, the strip $A^2$ continues between the dies of the die head being guided by the rib 265 (Figs. 5 and 10) formed on the lower portion of the stationary cross member 47, the channel of the strip embracing this rib, as shown. The other stationary member 48 engages the opposite face of the channel strip. These two members position the strip as it passes through the machine and also serve to straighten it, removing any curling which may have been given it by the feed rolls.

There is a gap 269 in the stationary members 47 and 48 at the center, Fig. 31 and 41. At that point the channel shaped strip $A^2$ bridges the gap and stands between the positioned male and female dies, as illustrated in Fig. 26. The projections 171, 172 and 173 on the male die are provided to enter the channel portion of the strip, enabling the embossing of the strip from within the channel toward the opposite face; the result being the production of the embossed strip $A^3$, as shown in Fig. 27.

*Shearing embossed strip.*

Whenever a complete line has been embossed on a strip, it is desirable to shear such strip from the remaining portion. This is effected by dies operated by a special shearing key, as now to be described.

The shearing dies, designated respectively 270 and 271, as shown in Figs. 20 and 21, are mounted in the die head adjacent to the center, as shown in Fig. 4, where the shearing die 271 appears; the same being held in idle position by one of the spring fingers of the comb 54, 55, engaging a notch 273 in the die. The forward end of the female shearing die 270 (mounted alongside of the male embossing dies in the rear portion of the die head) has two horizontal notches 274 and 275 to receive the flanges of the embossed strip $A^3$. It has also a vertical groove of considerable depth, designated 276. The male die 271 has a narrow front portion 277 adapted to snugly enter the groove 276 and shear out a piece of embossed strip corresponding to the thickness of the shearing end 277.

The shearing out of a piece of metal shoves this metal directly ahead of the active end of the male die and to provide for clearing this from the female die, I make the groove 276 of considerable depth and enlarge it laterally (see Fig. 22) and also increase its depth toward the rear of the die, as shown in Fig. 28. This provides sufficient clearance so that the piece sheared out drops freely out of the die. It falls to the bottom of the die head trough and passes out through a discharge conduit 279 through the body of the die head which may lead to a suitable receptacle not shown. The shearing die blocks have a somewhat longer stroke than the embossing die blocks, caused by the shearing dies being longer (see Fig. 5) and the clearance between them and the rams 98 being correspondingly reduced.

I have found that by shearing a narrow portion out of the strip, as indicated at $A^4$, Figs. 21 and 28, I do not distort the strip as would result with a single shearing.

I find that I have obtained the best result by slightly concaving the edges of the female shearing die which engage the inner face of the channel, as shown at 278, and forming a recess 272 with beveled ends on the end of the male die, so that the male die engages first the corner portions of the strip where the metal is to be sheared. I also form a slight central protuberance in the recess 272 on the male die which bends inwardly the face of the channel shaped strip slightly, which compensates for the distortion of the strip which tends to take place, leaving it substantially true after the shearing.

The shearing dies are actuated whenever desired by means of a special lever associated with the keyboard; I have shown for this purpose a key 280 (Figs. 1 and 9), placed behind the character keys and near the center of the keyboard. It is mounted on the upturned end of a lever 281 which extends rearwardly beneath the shaft 220 and is pivoted on the shaft 210 and behind its pivot continues alongside of the key levers 21 and is slidably guided by the comb 70; the rear of this lever 281 appearing in Fig. 4. The depression of this key operates similarly to a character key to shift the die head to bring the corresponding dies (the shearing dies) into active position and to initiate the rams which act on these dies to shear the embossed strip. The sheared strip is held on the rib 265 of the frame member 47 and may be shoved along by the following unsheared strip advanced by the rolls 250 and 251 or may be fed independently as hereinafter described.

To prevent the shearing key being operated when the die head is elevated (which would cause an idle operation of the embossing plungers, the shearing dies being out of registration with the rams) I provide means whereby the first portion of the movement of the shearing key moves the shift latch to idle position causing the die head, if elevated, to descend to its lowermost position. Mechanism for this purpose is indicated in Figs. 9, 11 and 34, and comprises a rock arm 285 in position to be engaged by the key lever 281, a rock shaft 286, and a rock arm 287 on that shaft carrying a roller 288 adapted to engage a cam surface 289 on the shift key latch 200 to move it to releasing position.

The next operation on the embossed strip is to curl or bend the flanges inwardly to give the strip the shape shown at A⁵ in Fig. 30, whereby the strip may be readily mounted on a holder having suitable overhanging lugs; an illustration of such holder being found, for instance, in my application, Serial No. 462,250, filed April 18th, 1921.

The curling of the edges of the strip referred to is effected by two rolls 290 and 291, heretofore mentioned, which are constantly rotating and serve to feed away from the machine the completed strip. The particular contour of these rolls is shown in Fig. 29. The roll 290 is formed with a circumferential groove 292 to clear the embossed characters and with concaved chamfered edges 293 to bear against the corners of the channel strip. The roll 291 is formed with two disc-like portions 294 providing a wide groove between them in which the other roll seats. At the intermediate portion of this wide groove are provided two beveled grooves 295 formed as shown in Fig. 29 and adapted to receive the flanged edges of the strip and bend or curl them inwardly into the position shown at A⁵.

I find it desirable to drive the rolls 290 and 291 continuously, and to this end I have mounted these two rolls on parallel vertical shafts 296 and 297, Figs. 6 and 17, and I gear these shafts together by the spur gears 298 and 299 and I extend the shaft 296 downwardly and provide at its lower end a worm wheel 300 meshing with a worm 301 on a shaft 302, this shaft carrying a spur pinion 303 which meshes with a gear 304 mounted on the side of the driving pulley 90.

By embossing lines on a narrow strip, shearing the strip into individual lines, and bending in the edges, and mounting such product in a suitable holder, (as illustrated for example in my application referred to) I effect a very material saving in metal over the older method of embossing each entire address on a single flat plate, since in the later case a large amount of unembossed material is necessarily employed which performs no useful purpose other than holding the embossed portion in place.

Furthermore, it is frequently desirable to change a portion of an address, for instance the street address, without changing the rest, as the name of the individual or the city. With my address plates having individual strips such change may be readily effected, the only metal lost being that required for the particular new line or lines substituted, whereas under the old system of embossing a single plate the whole plate had to be discarded whenever any change was made.

Fig. 42 indicates at C such address plate holder as above referred to. A⁵ indicates the individual embossed metal strips made by the present machine, which are slid endwise onto the oppositely projecting lugs c of the holder. B′ indicates a paper index card, carried on the holder by suitable lugs or lips thereof, and bearing an address corresponding to the strip address. This card is printed in the present machine at the same time that the characters are embossed, as hereinafter more fully explained, and necessarily corresponds therewith.

*Key lever locks.*

It is desirable to provide an interlocking device between the key levers to prevent the depression of more than one key at a time. A simple expedient to accomplish this result is shown in Figs. 1, 9 and 13 and comprises a transverse row of balls 305, each having a diameter equal to the distance between the central plane of the key levers and there being an aggregate space between the balls slightly greater than the width of the key levers. There is one less ball in the series than there are key levers, and they stand with the point of contact or the nearest approach of adjacent balls directly beneath corresponding key levers.

Now when any lever is depressed, it passes between the adjacent balls below it, separating them, as shown in the case of the key lever 21ᵇ in Fig. 13, thus taking up the aggregate spaces in the row of balls. It is now impossible to depress any of the other keys until after the key lever 21ᵇ has been raised. The aggregate space in the row of balls may be conveniently adjusted by a screw 306 bearing against the endmost ball in the row. The row of balls is conveniently mounted on a ledge 307 in front of a stationary comb 308 which guides the key levers. The balls are retained on the ledge by a strip 309 secured to the comb member 308.

It is also desirable that a key once depressed be mechanically retained in such position until after the cycle of operation, consequent upon its depression, has been completed. By providing mechanism for accomplishing this result, I enable the operator to take his finger off the key as soon as it is depressed without having to wait for the completion of the operation.

The lock mechanism last referred to is best shown in Figs. 5 and 12. On the rear edge of the key lever extensions 24, which engage the stub shaft 222 of one or the other of the switch operating arms 221, is formed a beveled tooth 311 having a notch 312 beneath it. A suitable distance above these teeth is a pivotally mounted cross rod 314 on which is secured a pair of depending plates 315, one for each half of the keyboard, each having at its lower end a forwardly projecting flange 316 adapted to enter the notch 312. This rod 314 also carries an upwardly extending arm 318 which may conveniently be made by cutting out and turning upwardly a portion of the rolled over hub of one of the plates 315.

Co-operating with the arm 318 is a latch 320 pivoted at 321 to the forward embossing lever 95. This latch is given a downward tendency by a spring 323 secured to it and to a stud carried by the embossing arm. The latch has a beveled nose 325 providing an abrupt shoulder adapted to overhang the arm 318. Mounted on the stationary frame block 111 is a plate 326 which the lower edge of the pawl normally engages and this pawl adjacent to this plate is provided on its lower edge with a lug 328 beveled in each direction.

The normal or inactive position of the parts under consideration is shown in Fig. 5, the plate 315 being pressed forwardly by the spring 329 and the flange 316 thus standing above the beveled teeth 311 of the key levers. As soon as a key lever is depressed, this beveled tooth, rising, forces the plate 315 toward the rear against the action of the spring 329 until the tooth has cleared the flange 316 when the plate springs forwardly the flange entering the notch 312, thereby locking this end of the key lever elevated.

As heretofore explained, the elevation of the rear end of the key lever operates the proper magnet to shift the die head and as the die head comes to position, the corresponding latch member 75 (Fig. 4) is raised by engaging the elevated rear end of the key lever and this raises the yoke 110 which, through the link 133 of the bell crank 114, pulls the rod 115 to release the clutch. The release of the clutch causes the rotation of the camshaft 91 (Fig. 2), whereby the embossing levers 95 and 96 are moved toward each other. As the upper end of the embossing lever 95 moves rearwardly in this action the nose 325 of the latch passes behind the arm 318, as shown in Fig. 12 and in broken lines in Fig. 5.

Following the embossing action, as the upper end of the arm 95 is returning to its normal position, the hooked nose 325 of the latch pulls the arm 318 forwardly, thereby rocking the shaft 314 and withdrawing the flange 316 from the key lever notch 312 and thus freeing the key lever. At the completion of this withdrawal the lug 328 on the latch rides up on the strip 326, thereby freeing the arm 318 so that the plate 315 springs back into normal position above the key lever teeth 311; the parts thus coming into the normal position shown in Fig. 5.

To prevent any key lever sticking in the actuated position after the latch plate 315 has released it, I provide the two arms 319 shown in Figs. 1, 5 and 12. Each of these arms is rigidly secured to the rock shaft 314 (and may be integral with the plate 135) and corresponding switch lever extensions 222, normally a sufficient distance above such extension to allow the operation of the switch levers. As the actuated key lever is being released, however, by the latch 320 swinging the rock shaft 314 and latch plate 315, the same movement lowers the forward end of the arm 319 to force downward to normal position the switch lever and any elevated rear portion of a key lever, thus insuring the return of the key levers and switch levers to normal position. By having this positive return, I avoid the necessity of strong springs to return the key levers and they thus make the action light and easy.

Whenever the space bar is depressed to cause the space between the embossed characters, the clutch must be closed to effect the proper operation of the strip feeding mechanism heretofore described. It is desirable, however, that the magnets be not energized by the space bar as it is entirely unnecessary to shift the die head at this time. Accordingly, the levers 241 and 242 of the space bar 240 do not have upward extensions corresponding to the extensions 24 of the other key levers. Instead, one of these levers 241 carries a pawl 340 (Fig. 5) which is pivoted to the rear portion of the lever at 341 and is normally held in the position shown in Fig. 5 by a tensile spring 342 secured to the pawl and to the frame. A stop 344 limits the rearward movement of the pawl. The pawl has a nose 345 which is adapted to engage beneath the forward end of the bell crank 114 which operates the clutch release rod 115.

The depression of the space key, raising the rear end of the lever 241, raises the pawl nose 345 and draws upwardly on the horizontal arm of the bell crank, thus pulling the clutch rod 115 forwardly sufficiently to release the clutch. A further movement of the space bar lever is idle since the edge of the pawl engages the stationary pin 344 which cams the pawl out of engagement with the bell crank so that the latter returns to normal position allowing the rod 115 to return and causes the cessation of the clutch operation at the end of one rotation. The lever 241 is adapted to enter the key lever interlock so that it is impossible to actuate either the space key or a character key if the other is depressed.

It may be desirable to employ a mechanism to prevent the return of a depressed key lever to normal position until after the die head is returned to central position, thus preventing any jamming should the keys be struck in such rapid succession that the subsequent one would be actuated after the preceding one had cleared the interlocking ball row but before the released die head has returned to its central position. A convenient mechanism for this purpose is shown in Figs. 36 and 37, though it is omitted from other views for clearness of illustration of the parts there represented.

It will be remembered that one or the other of the die centering levers 151 or 152 is necessarily retained at the rear of its position of rest whenever the die head is out of central position by reason of the gib 150 on the die head bearing against one or the other of the bars 153 on the levers. Now I mount adjacent the shafts 154, on which these levers are mounted, a rock shaft 360 journaled to the frame member 71 and carrying rock arms 361 supporting a roller 362 which is behind both of the levers 151 and 152 and adapted to be engaged by them. On each end of the rock shaft 360 is a rock arm 363 to the lower ends of which are connected bars 364 which are guided near their forward ends by brackets 365 secured to the bed plate. Each switch lever 221 carries a pawl 367 which is given a tendency to stand in a substantially vertical position by a spring 368. Springs 369, acting on the arms 363, tend to pull them rearwardly, thus maintaining the roller 362 in contact with one or both of the levers 151 or 152.

In the idle position of the machine, as shown in Fig. 36, the bars 364 have their forward ends just behind the adjacent edges of the pawls 367 so as not to interfere with the operation of the switch levers 221. Whenever a key is depressed its rear end, acting on the universal bar 157, swings the corresponding lever 151 and 152 and this carries the roller 362 rearwardly and projects the bar 364 forwardly but there is sufficient clearance at the forward end of these bars so that the lowering of the forward end of the switch lever, which takes place simultaneously with the raising of the rear of the key lever, will carry the pawl 367 in front of the forward end of the bar, so that as the bar continues its forward movement, it will simply swing the pawl laterally, the action being accordingly idle. After a key has been actuated, the two bars 364 remain in their forward position, notwithstanding the return of the key lever, until the die head has returned to central position, both bars 364 being held in this forward position so long as either lever 151 or 152 is rearward of its normal locking position. The pawls 367 on the two switch levers 221 therefore stand over the forward end of the bars 364 and accordingly the depression of any key is prevented until the die head comes to central position; when this takes place the lever 151 or 152, which was actuating the locking mechanism described, returns to neutral position and the springs 369 draw the latch bars 364 to the rear and thereupon all keys are released for actuation.

I may avail myself of the mechanism last described to lock the shift key whenever any character key has been depressed to prevent improper elevation of the die head, should the operator attempt to manipulate the shift key before the die head has returned to central position. This may be accomplished in a simple manner by providing an extension 366 (Figs. 36 and 37) of the left hand bar 364 which interlocks with a bar 347 secured to the adjacent shift lever 183 and guided by a stirrup 348. This bar has three notches 349, some one of which is opposite the end of the bar extension 366, according to the position of the shift at the time. The bar extension 366 accordingly enters one of these notches and locks the shift in its then position until the completion of the cycle, when the die head, by returning to central position causes the withdrawal of the bars 364.

*Strip discharger.*

In Figs. 2, 4, 31 and 35, I have shown a manually operated device for feeding the completed embossed and sheared strip from the shearing dies to the continuously operated discharge rollers 290 and 291. This device comprises primarily a peculiarly shaped flat dog 370 standing between the frame members 47 and 48, and carrying a roller 372 riding on the top surface of the frame member 48 or on a thin shim 373 (Fig. 4) secured to the upper edge of that frame member. The carriage constituted by this dog and roller is retained between the frame members but allowed to move longitudinally thereof by a pin 375 carried by the dog and extending into a groove 376 on the frame member 373. A weighted end 371 of the dog normally keeps it in the position shown in full lines in Fig. 4 with its lower end 377 above the region through which the dies travel.

In the idle position of the discharge carriage, shown in full lines in Fig. 4, the weight 371 and roller 372 rest on the shim 373 and the downwardly extending nose 377 of the dog is out of contact with the flanged strip $A^2$. When it is desired to remove from the machine an embossed sheared-off strip, the discharge carriage is simply moved manually toward the right; a thumb piece 378 on the carriage providing convenient means for such movement. In this movement the dog swings into the position shown in broken lines in Fig. 4 and just as the dog nose 377 reaches the space which has been sheared out on the completed strip, the roller 372 passes off the right hand end of the shim 373 with the result that the dog drops slightly and the nose 347 passes into the shearing space directly behind the severed position of the strip. The continuation of the movement of the discharge carriage, therefore, carries the severed strip with it to the right (as indicated in Fig. 31 where the dog is shown in action) until the strip passes between the continously rotating discharge rollers 290 and 291 and is delivered.

In the ordinary operation of the machine, the discharge carriage described is operated manually after the completion of each line. The discharge may be onto any suitable holder; I have shown in Figs. 3 and 6, a blade 390 carried by a bracket 391, serving as a storage member from which the strips may be removed manually or otherwise. The turned in flanges of the completed strip embrace this blade, and the blade acts to straighten the strip and overcome any curling given by the delivery rolls.

*Printing mechanism.*

The machine so far described is complete in itself to emboss characters on a strip of material and shear off the embossed strips to form such strip ready for insertion in a suitable holder, as for instance an address plate holder.

It is desirable, however, to combine with such machine mechanism for visibly printing characters corresponding to the embossed characters on suitable index cards or other record or identification. The embodiment shown in the drawing provides a simple and effective mechanism for accomplishing this result and will now be described with particular reference to Figs. 1, 2, 6, 9 and 14 to 19, inclusive.

The printing member comprises a type wheel 400 having three rows of characters corresponding to the characters of the three rows in the die head. That is to say, as shown, the upper row contains lower case characters, the middle row upper case, and the lower row numerals and punctuation marks. This printing wheel is slidably mounted on a stationary stud 402 rising from the transverse frame plate 103 which carries the rear embossing ram 98 (Fig. 10) as hertofore explained.

The printing wheel is rotated in correspondence with the lateral movement of the die head by means of a rack 420 which is carried by a guard plate 50 secured to the top plate of the die carrier, this rack meshing with a pinion 405 tight on the lower end of a sleeve 403 of the printing wheel. The printing wheel is shifted vertically in correspondence with the vertical shift of the die head, by means of the bifurcated shipper lever 412 which is pivoted at 413 to a boss in the upper face of the bar 103, and carries a roller 415 riding on the top of the rack bar and a pair of rollers 416 and 417 engaging the under face of the type wheel.

It results from the mechanism described that whenever any character in the die head is brought to embossing position the same character on the printing wheel comes to printing position—first by the vertical positioning of the printing wheel as the shift is operated—second, by the rotation of the printing wheel whenever the die head moves laterally.

The type characters on the printing wheel are directly inked as the printing wheel revolves by means of inking rollers of which two are shown at 452 in Figs. 14 and 19. These inking rollers are preferably felt discs mounted on spools 453 and held by studs 454 on a cross bar 455 mounted on the stud 402.

The impressing position of a printing wheel character is in the plane normally occupied by the topmost row and at the extreme rear. The character in this position stands directly in front of the foremost portion of the curved platen 440 and this platen is moved forwardly by the mechanism now to be described to cause the rearmost printing character to print on the forward face of the card or record interposed between the printing wheel and platen and carried with the latter.

The platen 440 is a curved elastic plate (Fig. 18) secured to the forward face of the yoke 441 which has arms 442 slidably embracing a square shaft 443. On the yoke is secured a marginal frame 450 in front of the edges of the platen for holding a card against it, the card being sprung or slid into place behind the frame. The card may be in a continuous strip, as indicated at B in Fig. 1, slid into the frame endwise. The shaft 443 is mounted at its end in two levers 444 and 445 which are keyed to the shaft 118 which carries the rear embossing lever 96. Accordingly, whenever the embossing operation takes place the rocking of the shaft 118 swings forwardly the platen 440 to cause the printing on the interposed card. This printing, it will be noticed is visible as it proceeds, so that the operator may readily note any error he may have made in striking the wrong key.

The yoke, platen and marginal frame constitute a paper carriage, which by suitable mechanism about to be described is fed toward the left one character space for each character printed. This feed takes place as the platen is returning from making a printed impression. The mechanism for effecting this is best shown in Figs. 14 and 15. Secured to the stationary bar 103 is a bracket 460 which carries a roller 461 which operates in a diagonal slot 462 on a lever 463 pivoted at 464 to a lug 465 on the lever 444. The rear portion of the lever 463 carries a dog 467 pressed by a spring 468 against a ratchet rack 470. The rack 470 is in the form of a flat bar longitudinally slidable through the levers 444 and 445 and carries lugs 472 engaging the yoke arms 442 of the carriage. A suitable detent pawl 475 mounted on a stationary bracket 476 and pressed by a spring 477 against the rack retains it in position against the action of a spring 478 secured to the rack and to the lever 444 which tends to return the rack.

It results from the above mechanism that as the platen carriage returns to the normal position shown in Fig. 17, the ratchet rack is fed toward the left one tooth which corresponds to the width of a character, the platen being fed such distance each time a character is printed.

While the embossing is in a continuous line it is desirable to print the record in successive lines one above another corresponding, for instance, to the lines on an address. This may be conveniently effected automatically by the operation of the key which shears the embossed line, since such shearing corresponds to the completion of a line. Accordingly, I provide mechanism to return the paper carriage to initial position and also to give it a portion of a rotation whenever the shift key is operated, thus presenting a fresh space on the card beneath the printed portion for the printing of the next line.

When the shearing key is operated one of the movements effected thereby is to disengage the pawls 467 and 475 from the ratchet rack so that the spring 478 may return the carriage to initial position. This movement of the shearing key mechanism is effected as follows:—

The shearing key 280 (see Fig. 9) overlies a bale 480 pivoted on the frame member 308. Secured to one of the arms of this bale is an upright arm 482, constituting with the bale a bell crank. The upper end of this arm 482 is connected by a link 483 to a lever 485 (Fig. 17) pivotally mounted on the shaft 118. This lever carries at its upper end a plate 487 which has upturned end portions 488 and 489, respectively, which lie behind the tails of the two pawls 467 and 475, respectively. A spring 486, Fig. 17, draws the lever rearwardly and tends to keep the shearing key manually elevated.

The depression of the shearing key depresses the yoke 480, swinging the arm 482 forwardly and drawing on the link 483, and thus swings forwardly the members 488 and 489 to engage the tails of two pawls and release the ratchet bar 470, so that the spring 478 returns the carriage to initial position.

To turn the carriage on its axis consequent upon its lateral return to initial position as above described, I provide the mechanism shown in Figs. 14, 15 and 16. On the right hand end of the platen carriage is a crown ratchet 490, the beveled teeth of which are adapted to coact with a beveled lug 492 rigid on the lever 444. As the carriage comes into its original position under the influence of the spring 478 the crown ratchet teeth bear the relation to the beveled tooth 492, shown in Fig. 15, and the engaging of these teeth causes the carriage to be given a partial rotation upwardly to bring a fresh space below the line printed into active position.

Pinned in the square shaft 443 is a collar 494 which has notches 495 in its edge engaged by a ball 496 pressed by a spring 497 mounted in the lever. The size of these notches 495 bears such relation to the notch of the crown ratchet 490 that the engagement of the crown ratchet with the beveled tooth 492 will turn the collar 494 sufficiently to carry its tooth which was engaging the front of the ball 496 to the rear thereof so that the ball reacts on the forward face of that tooth instead of its rearward face.

The action of the spring 497 is to turn the collar a slight further portion of a rotation; it cannot do this while the crown ratchet is in engagement with the tooth 492, but, as soon as the crown ratchet clears that tooth in the return of the carriage to operating lateral position, the spring 497, through the ball and the engaged beveled tooth 495, delivers such further portion of the rotation. This turns the carriage into the desired position for the next line and at the same time carries the tooth of the crown ratchet which was in front of the stationary tooth 492 slightly to the rear of the front edge of that tooth so that on the next return of the carriage to initial position, the bevel of that ratchet tooth will engage the bevel of the stationary tooth and cause the next turning of the platen.

To initially position the paper carriage rotatively, I mount on the end of the square shaft 443 a knurled hand wheel 499 by which it may be turned to the desired position; this hand wheel also furnishes convenient means for pulling the carriage lengthwise to position the printing of successive lines as desired. This enables these lines to be placed in échelon, if desired, after the manner of an envelope address, instead of all starting in the same vertical line. The lateral shifting of the carriage, however, may be effected by a few depressions of the space bar 240.

It results from the combination of printing and embossing mechanisms described that a paper record is produced having a properly arranged address corresponding to the individually embossed strip lines. It only remains therefore to cut off the paper strip into proper index card lengths and to mount such index card and the metal strips on a suitable holder—as indicated by B¹ and A⁵ on the holder C in Fig. 42.

Summary of operations.

I will now briefly summarize the cycle of operations of the machine; Assuming that a roll of flat metal ribbon has been placed in the reel 90 and a card in the paper carriage 441, the hand wheel 251 is turned to flange the edge of the ribbon and to feed it along the rib 265 until its forward end is the desired distance beyond the center of the machine, where the embossing takes place. The paper carriage is positioned laterally by its hand wheel 499 so that the desired portion of the card is directly behind the printing wheel.

Now the keys may be operated one after the other in rapid succession, and either shift key may be operated whenever necessary to change from the lower case to the upper case or to employ numerals or punctuation. Such operation of the character key first raises the rear end of its lever into position to stop the die head with the corresponding die in central position and then immediately energizes the solenoid which moves the die head in that direction. As the die head comes to position, the latch on its carriage rides up over the raised key lever end and drops on the far side of it; locking the die head in position, the springs taking up the blow. The rising of the latch on the die head carriage operates to withdraw the latch retaining rod, thus coupling the driven shaft to the continuously rotating power wheel. This results in the inward movement of the embossing rams, forcing the co-operating dies which are now in central position toward each other to emboss the strip. Then the embossing levers and rams return to normal position, and at the conclusion of the rotation of the driven shaft, the clutch becomes disconnected.

Whenever a key is depressed, the interlock prevents the depression of any other key, and the rear end of the key lever is latched in its elevated position by the latch which is released only on the return stroke of the embossing levers. As soon as the actuated key lever is released by this latch, it is returned positively to normal position by mechanism actuated by the return of the embossing lever. The die head released by the returning key lever immediately moves to normal central position under the influence of the springs opposing the solenoid action. Until it comes into that position even though all the levers are free from the interlock none can be depressed, because the stub shafts on the switch levers positively hold the rear ends of the keys until the die head, by reaching its central position, releases the switch levers.

At the same time that the die head moves to selected position under the influence of the solenoid and the stopping key lever, the printing wheel is turned to corresponding position by the rack carried by the die head, and the same actuation, under the control of the clutch and the embossing levers, swings forwardly the paper carriage to cause the positioned printing wheel to print on the card. The type wheel is automatically inked as it rotates by engagement with the absorbent inking rollers.

The operation just above described is the same irrespective of the key shift, this shift operating to raise the die head and the printing wheel one or two distances according to the shift operated.

It will be seen that each actuation of a character key results in embossing the corresponding character on the flanged strip, also in printing the corresponding character on the card in the paper carriage. As this cycle is completed, the strip feeding mechanism turns the feeding rolls to advance the strip the distance of one character and the ratchet, rack and pawl mechanism operating the paper carriage advances it a corresponding distance. The actuation of the space bar produces a similar feeding action for both the flanged strip and the paper carriage.

The operation described is continued until the line has been embossed on the strip and printed on the card. Then the shearing key is operated. This causes the shearing dies to cut out a small section of the flanged strip following the embossed characters, and the same operation releases the paper carriage pawls from the rack, and the paper carriage then returns to initial position and, in doing so, automatically turns up the paper one line. The sheared out portion of the strip drops into the trough of the die head and passes out by gravity into a suitable receptacle not shown.

The operator may now allow the completed embossed strip to remain in the machine for subsequent discharge by the feed of a following line or lines, or he may normally discharge it therefrom by operating the discharge carriage. This brings the strip to the delivery rollers, which operate to curve inwardly the flanged edges of the strip so that it is in proper form to slide over suitable retaining lugs on a type holder.

At the completion of the printing of a given address, for instance, the severed strips representing the different lines will be printed one under the other on the index or record card. The card is then removed from the paper carriage and placed in a suitable storage receptacle and at the same time the embossed strips may be mounted on a suitable holder. These strips may in the meantime be stored on a suitable receiving bar or other holder at the right hand side of the machine.

It will be understood from the description which has been given that my machine is capable of very rapid operation, by reason of its keyboard actuation and the automatic operation of the resulting mechanism. It has been customary heretofore in embossing machines, to shift the die carrier manually, such die carrier frequently being a very heavy wheel which is turned by hand. My die carrier is comparatively light. Its operation by magnets is quick and no trouble is experienced from its inertia either in starting or stopping. Both the embossing and the printing operations being effected by power and the key levers simply positioning the stops and closing the switches, the key touch may be very light.

By printing the cards in a visible way as the dies effect their embossing, not only is a record produced, but the operator may conveniently observe the characters embossed and will therefore know when an error has been made in striking the wrong key.

As shown in the drawings, my invention is capable of embodiment in a comparatively small compact machine. While the effectiveness of the mechanism employed has been demonstrated, it will of course be understood that many of them may be greatly changed from the form shown, and that numerous modifications may be made for effecting the same results; all of which is intended to be included within my invention as hereinafter claimed.

Having thus described my invention, I claim:

1. In a machine of the character described, the combination of a die carrier movable as a unit and carrying cooperating male and female dies arranged in straight rows facing each other, means for periodically feeding a continuous ribbon between male and female dies in the direction of the length of the rows, and a keyboard for controlling the position of the die carrier.

2. In a machine of the character described, the combination of a die carrier reciprocable as a unit and carrying co-operating male and female dies, means for periodically feeding a continuous ribbon between the male and female dies, a keyboard and mechanism controlled thereby for causing the operation of said dies.

3. The combination of a reciprocable die carrier having male and female dies, mechanism for reciprocating it, and a keyboard for controlling it.

4. In an embossing machine, the combination of a movable die carrier having co-operating sets of male and female dies, a keyboard, power mechanism controlled thereby to shift the die carrier in either direction from a central position of rest, and mechanism for moving the male and female dies toward each other.

5. In an embossing machine, the combination of a movable die carrier having co-operating sets of male and female dies, said die carrier being normally stationary, a keyboard, power mechanism controlled thereby to initiate the movement of the die carrier in either direction, means controlled by the keys for stopping the die carrier in selected position, and mechanism for moving cooperating male and female dies toward each other to emboss interposed material.

6. In a machine of the character described, the combination with a unitarily movable member for holding a set of male and female dies having different characters with their faces constantly opposite each other, means for holding a continuous ribbon of material to be embossed in position between male and female dies, mechanism for moving said member to present said set of dies to the ribbon to select the character to be embossed in a given position on the ribbon, a keyboard having finger keys corresponding to the different characters, and means whereby the actuation of a character key in the keyboard controls the operation of said mechanism.

7. The combination of a die carrier reciprocable as a unit and having a set of co-operating male and female dies, power mechanism for moving said die carrier, a keyboard and mechanism operated thereby to initiate the operation of said power mechanism, and mechanism for moving the selected dies to effect an embossing operation.

8. The combination of a die carrier movable as a unit and having a set of co-operating male and female dies, a roll of ribbon to be embossed, means for guiding it in a straight line between said dies, power mechanism for moving said die carrier, power mechanism for operating properly positioned dies to effect the embossing, a keyboard, and mechanism operated thereby to initiate the operation of the mechanism for moving the die carrier and to stop the same with the proper dies in active position and for initiating the operation of the embossing mechanism.

9. In a machine of the character described, the combination with a set of male and female dies, a carrier in which the same are mounted, mechanism adapted to move the carrier from a position of rest to various positions for action, a keyboard adapted to initiate the operation of said mechanism and also to stop the movement of the set of dies with the particular dies corresponding to the key actuated in active position, and means for moving selected male and female dies toward each other to effect embossing.

10. In a machine of the character described, the combination with a set of male and female dies, power mechanism adapted to move the same from a position of rest to various positions for action, a keyboard adapted to initiate the operation of the power mechanism and also to stop the movement of the set of dies with the particular dies corresponding to the key actuated in active position, and means for moving selected male and female dies toward each other to effect embossing.

11. In a machine of the character described, the combination of a movable member for holding male and female dies, and means for holding material to be embossed, said movable member having a central position of rest, mechanism for moving said member in either direction therefrom, a keyboard for controlling such movement, and means for moving selected male and female dies toward each other to effect embossing, and mechanism for automatically returning the moved means to its central position following the embossing operation.

12. In a machine of the character described, the combination of a set of male and female dies, mechanism adapted to move the same in either direction from a central position of rest to various positions for action, a keyboard having keys corresponding to the different dies adapted to initiate the operation of said mechanism and also to stop the movement of the set of dies with the particular dies corresponding to the key actuated in active position, and means for moving selected male and female dies toward each other to effect embossing.

13. In a machine of the character described, the combination with a set of male and female dies, mechanism adapted to move the same from a position of rest to various positions for action, a keyboard adapted to initiate the operation of said mechanism and also to stop the movement of the set of dies with the particular dies corresponding to the key actuated in active position, and power mechanism initiated by such stopping movement and operating to move toward each other the positioned dies.

14. The combination with a die carrier having a set of co-operating male and female dies, mechanism for moving said die carrier, mechanism for operating properly positioned dies to effect the embossing, a keyboard and mechanism controlled thereby to initiate the operation of the mechanism for moving the dies and to stop the die carrier with the proper dies in active position and for initiating the operation of the embossing mechanism.

15. In an embossing machine, the combination of a die head, co-operating male and female dies carried thereby, a keyboard adapted to cause reciprocation of the die head, and means for moving positioned dies toward each other to effect the embossing.

16. The combination of a die head carrying male and female dies, of a keyboard and mechanism controlled thereby for moving the die head in either direction from a central position of rest, and means for moving positioned dies toward each other to effect the embossing.

17. The combination of a die head carrying male and female dies and movable in either direction from a central position of rest, a keyboard, power mechanism for moving the die head, and means whereby the actuation of a key initiates the operation of the power mechanism and stops the die head with dies corresponding to the key in active position, and means for moving positioned dies toward each other to effect the embossing.

18. In an embossing machine, the combination of a die head carrying male and female dies arranged in rows facing each other and spaced apart, means for progressing between said dies a flanged ribbon extending lengthwise of the rows and including guiding means engaging the ribbon flange, means for reciprocating the die head in a straight line parallel with said rows to select the dies which shall be in the embossing position, and means for operating the dies so positioned.

19. In an embossing machine, the combination of a die head carrying male and female dies and reciprocable in a straight line, means for so reciprocating the die head, and means operated automatically consequent upon the die head coming to position for causing positioned dies to approach each other to effect the embossing.

20. The combination, with a member having a set of male and female dies and a member guiding a strip to be embossed thereby, of means for causing relative movement of such co-operating members one to the other in either direction from a position of rest, a keyboard, mechanism operated thereby divided into two groups, one of which controls the movement in one direction and the other in the opposite direction, and means for moving selected male and female dies toward each other to effect the embossing.

21. The combination, with a normally stationary die head carrying a set of male and female dies and movable in either direction from a central position of rest, of a keyboard, mechanism operated thereby divided into two groups, one of which controls the movement of the die head in one direction and the other in the opposite direction, and means for moving selected male and female dies toward each other to effect the embossing.

22. The combination of a reciprocable die head carrying male and female dies, a keyboard having key levers divided into two groups, mechanism whereby the actuation of any key in the first group moves the die head in one direction and stops it in position according to the key actuated, means whereby the actuation of any key in the second group moves the die head in the opposite direction and stops in a position corresponding to the key in that group, and means for moving selected male and female dies toward each other to effect the embossing.

23. The combination with a reciprocable die head carrying embossing dies and having a central position of rest, of a keyboard having key levers arranged in two groups, one on each side of the central position of rest of the die head, mechanisms for moving the die head in opposite directions respectively, means whereby the depression of any key in either group operates the corresponding power mechanism to move the die head toward such key lever, means whereby the actuated key lever presents a stop in the path of mechanism moving with the die head to stop the latter with the dies which correspond to such key lever in active position, and means for moving selected male and female dies toward each other to effect the embossing.

24. In an embossing machine, the combination of a die carrier having a set of male and female dies and adapted to move back and forth, means for stopping the movement, shock absorbing means to cushion the blow as the die carrier is stopped, and means for moving selected male and female dies toward each other to effect the embossing.

25. The combination with a die carrier movable in either direction from a central position of rest, mechanism for so moving the die carrier, and a pair of springs adapted to cushion the blow in each direction respectively.

26. The combination with a die head, a set of male and female dies mounted therein, power mechanism adapted to move the die head from a position of rest in either direction, a keyboard for initiating such mechanism and for stopping the die head, and two shock absorbing springs adapted to yieldingly oppose the movement of the die head in two directions respectively.

27. The combination with a die carrier having male and female dies, power mechanism for reciprocating it, and a key controlled latch for holding it in selected position.

28. The combination of a reciprocable die carrier having a set of male and female dies, power mechanism for moving the die carrier in either direction from a position of rest, a keyboard, mechanism controlled thereby for initiating the power mechanism, and latch mechanism controlled by the key actuated for locking the die head in corresponding position when it is brought to that position by the power mechanism.

29. The combination with a reciprocable die head, of an abutment yieldingly carried thereby, a keyboard, and mechanisms controlled thereby for moving the die head and for bringing a stop into the path of said abutment.

30. The combination of a die carrier movable in either direction from a central position of rest, a keyboard having its key levers divided into two groups respectively on opposite sides of said central position of rest, mechanisms whereby the actuation of a key in either group moves the die head in that direction, and a latch movable with the die head and co-operating with the actuated key lever to correspondingly stop the die head, and mechanism for actuating the die initiated by said latch.

31. In an embossing machine, the combination with a die head movable from a normal position of rest, male and female dies carried thereby, mechanism for moving the die head, a latch movable with the die head, a keyboard, and means controlled thereby for initiating the operation of the mechanism which moves the die head and positioning a stop in the path of said latch, mechanism for projecting positioned dies toward each other to effect the embossing, and means controlled by the movement of said latch for initiating said embossing operation, and means operating consequent upon the embossing operation for releasing the latch.

32. The combination with a die carrier movable in either direction from a central position of rest, male and female dies carried by the die carrier, a pair of latches movable with the die carrier, a keyboard having its key levers divided into two groups, mechanism whereby the actuation of a key in either group causes the movement of the die head toward the levers of that group, any actuated key lever being adapted to coact with the corresponding latch movable with the die head to position the latter with the dies corresponding to such key in active position, and mechanism adapted to be actuated by either latch to move the selected male and female dies toward each other to emboss interposed material.

33. In an embossing machine, the combination of a member having a set of male and female dies, a co-operating member guiding a strip to be embossed by the dies, electro-magnetic means for moving one of said members, a keyboard, means controlled thereby for actuating the electro-magnetic means, and mechanism for moving cooperating male and female dies toward each other to emboss intermediate material.

34. In an embossing machine, the combination of a reciprocable die carrier having a set of male and female dies, electromagnetic means for moving the die carrier in either direction, a keyboard, means controlled thereby for actuating the electromagnetic means, and mechanism for moving cooperating male and female dies toward each other to emboss intermediate material.

35. The combination of a reciprocable die head carrying a set of male and female dies, electro-magnetic mechanism for moving the die head in either direction from a position of rest, and yielding mechanism opposing the movement of the die head.

36. The combination of a die head carrying male and female dies and moving in either direction from a central position of rest, a pair of electro-magnets, mechanism operated thereby for moving the die head in opposite directions respectively, a pair of springs for opposing such movement respectively, and a keyboard and mechanism controlled thereby for energizing said magnets.

37. In an embossing machine, the combination, with means for carrying dies and material to be embossed, of a pair of solenoids, a core bar common to the two solenoids and movable thereby in opposite directions, and mechanism connecting the core bar with one of said means.

38. In an embossing machine, the combination of a reciprocating die head carrying co-operating embossing dies, a pair of solenoids, a core bar common to the two solenoids and movable thereby in opposite directions and lever mechanism connecting the core bar with the die head.

39. In an embossing machine, the combination of a die head carrying embossing dies, a pair of solenoids, a core bar common to the two solenoids and movable thereby in opposite directions and lever mechanism connecting the core bar with the die head, a keyboard, mechanism controlled by the keys thereof for actuating one solenoid or the other according to the key depressed, and means positioned by a depressed key for stopping the die head.

40. The combination of a movable die carrier having male and female dies with their faces constantly opposite each other, each die having a plurality of faces rigid with each other, means for guiding material to be embossed between the dies, and shift mechanism for rendering either face of the dies active to emboss the same region of the material.

41. The combination of a reciprocable die head carrying male and female dies opposite each other and spaced apart, and each having a plurality of faces, means for guiding between the opposed faces a ribbon of material to be embossed, means for shifting the die head transversely of the ribbon to determine which face is active, and means for moving the die head longitudinally of the ribbon and transversely of its movement first mentioned to select the die.

42. The combination with a die carrier comprising a trough shaped block movable as a unit and having male and female dies with their faces constantly opposite each other, each die having a plurality of faces, a keyboard for positioning the die carrier, and shift mechanism for rendering the desired face of the dies active.

43. The combination of a die head movable in opposite directions and carrying male and female dies of various characters, each of which dies has a plurality of faces, a keyboard having keys corresponding to said characters, power mechanism controlled thereby for moving the die head to select the die, a shift key associated with the keyboard, and mechanism actuated thereby for moving the die head transversely of its movement first mentioned to bring the desired die face into active range.

44. The combination of a die carrying member, male and female dies movably mounted therein, means for guiding between such dies a ribbon of material to be embossed, means for moving the die carrier relative to such ribbon, each die comprising an individual block having a plurality of faces, the faces on each die being in a row at right angles to the path of movement mentioned, and means for moving one of said members in a direction parallel with said rows to select the proper face to emboss the material.

45. The combination of a horizontally movable die carrier having a set of male and female dies arranged facing each other in horizontal row, each die having on its end a plurality of characters one above the other, mechanism for moving the die head horizontally, and mechanism for shifting it vertically.

46. The combination with a die head carrying a row of individually movable coacting embossing dies, each die having on its end a plurality of related characters arranged in a direction transverse to the row of dies, a keyboard having keys corresponding to the respective dies, mechanism whereby the actuation of any key causes corresponding movement of the die head to bring the die corresponding to the key into active position, a shift mechanism associated with the keyboard, and means whereby the actuation of the shift mechanism selects which of the characters on the die shall be active, and automatic mechanism adapted to project the dies toward each other to cause the selected character to emboss on an intermediate strip.

47. In an embossing machine, the combination of a movable die head having individually movable male and female dies arranged in two straight rows facing each other, and means for moving said head in either direction along a straight line from a central position of rest, means for causing selected dies to approach each other to emboss an interposed strip, and means for automatically returning the die head to said central position following the embossing action.

48. In an embossing machine, the combination of a movable die head having individually movable male and female dies arranged in two straight rows facing each other, a keyboard, and means controlled thereby for moving said head in either direction along a straight line, and means for moving the dies toward each other to emboss an interposed strip.

49. In an embossing machine, the combination of a movable die head having individually movable male and female dies arranged in two straight rows facing each other, a pair of solenoids, a common core bar therefor, and mechanism connecting it with the die head for moving said head in either direction along a straight line, means for stopping such movement, means for moving the dies toward each other to emboss an interposed strip, and a keyboard for controlling all of said means.

50. In an embossing machine, a die head having a longitudinal groove, a pair of stationary bars occupying said groove and adapted to guide lengthwise of the groove the material to be embossed, and coacting male and female dies carried by the die head in two rows on opposite sides of the groove respectively.

51. The combination of a die head having a trough shaped recess, dies carried by the head on opposite sides of the recess and movable toward each other to emboss the interposed strip, a pair of guide bars extending into the recess and serving to guide the strip between them, and rollers carried by said die head and bearing on the guide bars.

52. The combination of a die head having a trough shaped recess in its upper portion, a member depending thereinto for positioning a strip to be embossed, dies carried by the head on opposite sides of the recess and movable toward each other to emboss the interposed strip, rollers carried by said head, guides on which said rollers run, a keyboard and mechanism controlled thereby for moving and positioning the die head.

53. In an embossing machine, a die head comprising a bifurcated block, dies slidably mounted in the two forks of the block respectively, said blocks having also a pair of bifurcated legs, and a bar which said legs straddle and on which the die head is mounted to travel.

54. In an embossing machine, a horizontally movable die head having an upwardly facing groove in its upper portion, a pair of stationary horizontal bars occupying said groove and adapted to guide between them the material to be embossed, and coacting male and female dies carried by the die head in two rows on opposite sides of the groove respectively, and adapted to emboss the material through a gap in said bars.

55. The combination of a laterally movable die carrier having a set of male and female letter character dies arranged facing each other in straight row, each die having on its end a plurality of related characters in a straight row transverse to the row first mentioned, mechanism for moving the carrier in the direction of the first mentioned row, and mechanism for shifting it in the direction of the second mentioned row.

56. In an embossing machine, a die head comprising a bifurcated block, die blocks mounted in the two forks of the block and slidable toward and from each other ,and having dies on their proximate ends, a pair of brackets carried by the forks of the die head respectively, and a pair of comb springs carried by the brackets respectively.

57. The combination of a die head consisting of a block having a groove in its top portion, die blocks mounted in the forks of the head on opposite sides of the groove, stationary members extending into the groove for guiding the material to be embossed, means for moving the die head laterally, and rollers carried by the forks of the die head and engaging the opposite faces of said stationary members.

58. In an embossing machine, the combination with a carrier rigid with itself and movable as a unit, of embossing dies mounted therein and arranged in two sets, the male dies in one set and the female dies in the other, each die having a plurality of faces rigid with each other, the corresponding male and female faces being constantly opposite each other, and shift mechanism for selecting the set of faces to which the material to be embossed shall be presented.

59. The combination of a multiple die carrier, a set of male dies and a set of female dies carried by said die carrier and all movable as a unit, said dies being movable in the die carrier toward each other, and each die block having a plurality of faces on its active end, means for positioning the die carrier to select certain dies, and other means for positioning the die carrier relative to the material to be embossed to determine which face of the die is to be active.

60. In an embossing machine, two sets of coacting die blocks, one set having a plurality of projections on its end with male characters on the ends of the projections, and the other set having coacting female characters on its end, and means for feeding a channel shaped strip to be embossed with the said projections occupying the channel of the strip.

61. The combination of a die head carrying embossing dies, a bar on which the die head is mounted for lateral travel, a pair of slides in which the ends of the bar are mounted, and a shift mechanism for operating the slides.

62. The combination of a die head having embossing dies, a bar on which the die is mounted for lateral travel, slides carrying the bar, a latch carriage mounted for lateral travel, and a sliding connection between the same and the die head.

63. The combination with a die head carrying embossing dies and guided to move in either direction from a central position of rest, a latch carriage guided to move parallel with the movement of the die head, a sliding connection between the die head and latch carriage at right angles to said lateral movement, and a pair of abutments carried by the latch carriage and adapted to coact with key levers on either side of the central position respectively.

64. The combination of a die head, movable laterally and also at right angles thereto, a latch mounted in a carriage guided to move parallel with the die head lateral movement, means for slidably connecting the die head and carriage to allow independent movement thereof at right angles to the said lateral travel, a keyboard having key levers adapted to coact with the latch, and a shift key for causing the said right angle movement.

65. The combination of a die head carrying embossing dies, and a latch movable with the die head and comprising a resilient abutment adapted to engage a member positioned by the depression of a key, and a bevel-nosed latch bar adapted to slide over said member to house it between the latch bar and abutment.

66. The combination with a keyboard having key levers, of a die head, means for moving the die head actuated by the key levers, embossing dies carried by the die head, a latch carriage movable laterally with the die head, a pair of resilient abutments carried by the latch carriage, a pair of bevel-nosed latch bars slidably mounted in the latch carriage, one abutment and latch bar being adapted to coact with the key levers on one side of the center, and the other abutment and latch bar with the key levers on the other side of the center, and embossing mechanism set into action by the longitudinal movement of either latch bar.

67. The combination of a laterally movable die head, die blocks carried thereby, a bar on which the die head is mounted to travel, and a helical compression spring surrounding the bar and serving to return the die head.

68. The combination of a die head, embossing dies carried thereby, said die head having a pair of depending bifurcated legs, a bar which said legs straddle, rollers carried by the die head engaging the bar, and helical springs surrounding the bar for cushioning the travel of the die head.

69. The combination of a die head carrying embossing dies, and movable in either direction from a central position of rest, a bar extending through an opening in the die head, and a pair of compression springs on the bar yieldingly opposing the movement of the die head.

70. The combination with a reciprocable die head having a central position of rest, of a keyboard, mechanism actuated thereby for moving the die head in either direction from its position of rest, a center lock for the die head to hold it in its normal position, means whereby actuation of the key releases said center lock.

71. The combination with a reciprocable movable die head carrying embossing dies, a center lock for the die head comprising a pair of levers carrying lateral bars with a space between them, and means on the die head coacting with said bars and adapted to enter said space.

72. The combination with a movable die head carrying embossing dies, a keyboard having key levers, a lock for the die head comprising a pair of levers carrying lateral bars with a space between them, and a gib on the die head coacting with said bars and adapted to enter said space, each lever carrying a universal bar adapted to be engaged by the corresponding key levers.

73. The combination with a laterally movable die head carrying embossing dies, a keyboard having key levers, a latch mechanism movable laterally with the die head and adapted to coact with the elevated rear end of the key lever to lock the die head in position, a center lock for the die head comprising a pair of levers carrying lateral bars with a space between them, and a gib on the die head coacting with said bars and adapted to enter said space, each lever carrying a universal bar adapted to overhang the rear ends of the corresponding key levers.

74. The combination of a reciprocatory die head, dies carried thereby, a keyboard having key levers, the rear ends of which are elevated when the keys are depressed, a latch movable with the die head and adapted to lock the same to the actuated key lever, a center lock for the die head, and means carried thereby and overhanging the rear ends of the key levers whereby the depression of any key results in releasing the center lock.

75. The combination with a reciprocable die head having a central position of rest, of a keyboard, mechanism actuated thereby for moving the die head in either direction from its position of rest, a center lock for the die head to hold it in its normal position, means whereby actuation of the key releases said center lock, and yielding means carrying said center lock whereby the engagement thereof with the die head as it returns to normal position is cushioned.

76. In an embossing machine, the combination of a die head, embossing dies carried thereby, means for guiding said die head to reciprocate in a straight line, a gib carried by the die head, and means for engaging it to lock the die head in the normal central position.

77. A die head comprising a block having embossing dies, a pair of centering levers carrying bars adapted to engage a gib on the die head, there being a space between the bars which said gib may enter, a pair of shafts on which the levers are mounted respectively, and springs yieldingly positioned in said shafts.

78. The combination with a die head carrying embossing dies, means for moving the die head in either direction from a position of rest, springs opposing said movement, a yieldingly carried center lock for centering the die head, and a yieldingly carried latch mechanism for locking it in selected position.

79. The combination with a reciprocable die head carrying embossing dies, of mechanism for normally holding said die head in a position of rest, a keyboard, mechanism operated thereby for moving the die, and an interlocking device between the means for locking the die head in rest position and the keyboard, preventing the actuation of the keys until the die head has returned to rest position.

80. The combination of a die head carrying embossing dies, said die head being normally stationary and movable from its position of rest, means for normally locking the die head in its position of rest, a keyboard, mechanism controlled thereby for releasing the die head lock and moving the die head to selected position, and means for locking the key which caused such actuation in its operative position until after the die head has returned to its position of rest.

81. The combination with a die head carrying embossing dies and having a central position of rest, and being movable in either direction therefrom, a lock for holding the die head in its central position, a keyboard divided into two groups, each adapted to cause movement of the die head from the central position toward that group and to hold it in selected position according to the key depressed, mechanism whereby the depression of said key results in unlocking the die head center lock and in locking the key in its actuated position, means for releasing the key after the die head has been positioned, and means for preventing the return of the key after its release until the die head has returned to central position.

82. The combination of a movable die carrier having upper and lower case male and female dies, a keyboard, mechanism controlled thereby for positioning the carrier, a shift mechanism for shifting the carrier to determine the die face which is to be active, means for operating the dies to effect embossing and means for locking the shift mechanism until after the embossing.

83. The combination of a movable die carrier, having upper and lower case, male and female character dies, a keyboard having keys corresponding to the die characters, mechanism controlled by the keyboard for positioning the die carrier, a shift mechanism for shifting the carrier transversely of its positioning movement to determine the die face which is to be active, means for causing selected dies to approach each other when the carrier is in an active position, means for locking the keys until the die carrier has returned to neutral position, and means for locking the shift mechanism until the die carrier has returned to neutral position.

84. The combination of a reciprocatory die head carrying embossing dies, a keyboard for positioning the die head, said keyboard having keys mounted on the forward ends of pivoted key levers, and a latch movable with the die head and adapted to engage the rear end of a key lever when the key is depressed.

85. The combination of a reciprocatory die carrier having a set of male and female character differing dies, a latch movable therewith, a keyboard having keys corresponding to the die characters, mechanism controlled thereby for moving the die carrier in either direction from a central position of rest, means whereby each key lever may co-operate with the latch to stop the die carrier in selected position, a single rotation clutch released by the coaction of the die carrier latch with the key lever, and mechanism for operating the selected dies actuated by said clutch.

86. The combination of a die carrier movable as a unit and having male and female dies, means for guiding the ribbon of embossable material between the dies, a keyboard, mechanism actuated thereby for moving the carrier, a latch mechanism movable with the die carrier and coacting with an actuated key lever to stop the die carrier, a single rotation clutch released by the latching action described, rams adapted to act on the positioned dies, a pair of levers for operating said rams, adapted to be actuated by said clutch, and means whereby the reverse movement of the levers operates to feed the embossable material.

87. The combination of a die carrier having male and female dies and normally at rest, a keyboard, mechanism actuated thereby for moving the carrier, a latch mechanism movable with the die carrier and coacting with an actuated key lever to stop the die carrier, a single rotation clutch released by the latching action described, rams adapted to act on the positioned dies, a pair of levers for operating said rams, a pair of cams for operating said levers, and a shaft on which said cams are mounted and which is adapted to be connected by said clutch with a suitable source of power.

88. In an embossing machine, the combination of a movable die head carying embossing dies, means tending to return the die head to normal position, a keyboard, means whereby an actuated key lever provides a stop limiting movement of the die head, a latch for holding said key lever in actuated position, mechanism for effecting the embossing, and means for releasing the latch after the embossing has taken place.

89. The combination of a movable multiple die head, embossing dies carried thereby, a keyboard having levers, latch mechanism for locking the die head in position according to the lever actuated, means for locking the actuated key lever in actuated position, and means operated after the embossing operation for releasing the actuated key lever.

90. The combination with a die carrier having a set of male and female dies, different pairs of dies in the carrier having different faces, power mechanism for reciprocating the carrier, and a key controlled latch for holding it in selected position.

91. The combination of a movable die head having embossing dies, a keyboard having keys and key levers, mechanism under control of the key lever for positioning the die head, mechanism for operating the positioned dies to effect the embossing, a latch acting on the actuated key lever, and automatically acting means for releasing said latch after the embossing mechanism has acted and for positively returning the key levers to active position after the embossing operation.

92. The combination of a die head carrying embossing dies, key levers, means whereby the actuation of the key causes movement of the die head, a latch movable with the die head and adapted to engage the elevated rear portion of the key lever to position the die head, an automatically operating latch to lock such key lever in its actuated position, means for moving the dies to effect embossing, and means whereby such embossing mechanism on its return stroke is accompanied by the release of the key lever latch.

93. The combination of a reciprocable die carrier having a set of male and female dies, corresponding to the different characters of typewritten language, mechanism for moving the die carrier in either direction from a position of rest, a keyboard, mechanism controlled thereby for initiating the power mechanism, and latch mechanism controlled by the key actuated for locking the die head in corresponding position when it is brought to that position by the power mechanism.

94. The combination with a normally stationary reciprocable die carrier, individually movable male and female character dies carried thereby, a keyboard having corresponding character keys, means actuated by the keyboard for positioning the die carrier corresponding to the key depressed, a clutch released automatically consequent upon the positioning of the die carrier, means for operating the dies and means for feeding the material to be embossed both controlled by the clutch, and a space key adapted to release the clutch without moving the die carrier.

95. The combination of a die head carrying embossing dies, a keyboard having key levers, means for moving the die head actuated by the movement of the keys, a latch movable with the die head coacting with an actuated key lever, a clutch, a linkage between the latch and clutch for actuating it, a space bar, mechanism connecting it with the linkage, whereby it may release the clutch without actuating the die head, and mechanism for feeding the strip consequent upon the actuation of the clutch.

96. The combination of a die head movable in each direction from a central position of rest, a pair of solenoids, a core bar therefor, a connection between the core bar and die head for moving the die head in either direction according to the solenoid energized, a keyboard having its key levers divided into two groups, a pair of electric switches related to the respective solenoids, a pair of levers for operating the respective switches, each lever being adapted to be actuated by the corresponding group of key levers.

97. The combination with a die head carrying embossing dies, of an electro-magnet for moving the die head, a latch movable with the die head, a keyboard having key levers adapted to coact with the latch to position the die head, and a switch for the magnet including a lever having an operating member extending across a set of key levers, whereby actuation of such key levers may close the switch.

98. The combination of a die carrier, a keyboard having key levers, electro-magnetic means for moving the die carrier, a switch for closing the circuit to the electromagnetic means, a keyboard having key levers, said switch including a lever having a universal bar actuated by any of a number of key levers, the die head having a latch coacting with any actuated key lever, a latch to retain a key lever in actuated position, means for operating the dies to perform the embossing, means coincident with the return of the embossing means for releasing the key lever latch, and means to positively return the actuated key lever following the release of its latch.

99. The combination of a die carrier reciprocable as a unit and having male and female dies formed to produce raised characters of an alphabet, a keyboard having keys corresponding to the characters of the dies, mechanisms controlled thereby for positioning said die carrier with those dies which correspond to the key actuated in active position, and for actuating said dies, and means for periodically feeding a strip of material to the dies.

100. In an embossing machine, the combination of a movable member having a set of male and female letter character dies, a cooperating member guiding a strip to be embossed by the dies, electro-magnetic means for moving said movable member, a keyboard having letter character keys, means controlled thereby for actuating the electro-magnetic means, and mechanism for moving cooperating male and female dies each toward the other to emboss intermediate material.

101. In an embossing machine, the combination with a set of coacting pairs of male and female dies, each pair being adapted to produce a different character on material to be embossed, of a pair of solenoids, a core bar common to the two solenoids, and movable thereby in opposite directions, and mechanism connecting the core bar with the means carrying said set.

102. In a machine of the character described, the combination with mechanism for gradually flanging the edges of a continuous strip, and male and female dies, one formed to occupy the channel of the strip for thereafter embossing said strip between the flanges.

103. In a machine of the character described, the combination with intermittently coacting rollers for flanging the edges of a flat strip, of mechanism for thereafter embossing said strip during a period of intermission.

104. In an embossing machine, the combination with embossing dies, of strip feeding rolls which are adapted to receive a flat ribbon of material and feed it to the dies, and flange the edges of it as they feed it.

105. In a machine of the character described, the combination, with a keyboard, of mechanism controlled thereby for flanging the edges of a strip, and for embossing the strip between the flanged edges.

106. The combination with rolls for flanging the edges of a flat strip, dies for embossing the strip, and a keyboard adapted to control said rolls and dies.

107. The combination with mechanism for flanging the edges of a flat strip, mechanism for then embossing the strip, and mechanism for thereafter bending inwardly the flanged edges.

108. The combination of rolls for flanging the edges of a flat strip, dies for then embossing the intermediate region of the strip, and rolls for thereafter bending inwardly the flanged edges.

109. The combination of mechanism for embossing a strip of material, and rolls for thereafter bending inwardly the two edges of the strip.

110. The combination of a keyboard, and mechanism controlled thereby for embossing a strip of material, and continuously rotating rolls for thereafter bending the edges of the strip.

111. The combination of mechanism for embossing a line on a strip of material, mechanism for then shearing the strip, and rolls for then bending inwardly the edges of the strip.

112. The combination of mechanism for embossing a line on a strip of material, mechanism for then shearing the strip, a keyboard and dies controlled thereby for effecting such operations, and mechanism for bending inwardly the edges of the strip.

113. The combination of mechanism for flanging the edges of a flat strip to make it channel shape, mechanism for then embossing characters on the strip, mechanism for then shearing the strip into line lengths, and mechanism for then bending in the edges of the embossed and sheared strips.

114. The combination of rolls for flanging the edges of a continuous strip to make it channel shape, dies for embossing characters on the strip, dies for then shearing the strip into line lengths, and mechanism for then bending in the edges of the embossed and sheared strip.

115. The combination with a pair of coacting rolls which are adapted to flange the edge of a strip and feed it, means for periodically operating said rolls, and a pair of continuously rotating rolls which are adapted to bend in the flanges on the strip, and dies adapted to act on the strip between said pair of rolls.

116. The combination of periodically acting rolls for feeding a strip and at the same time flanging its edges to make it channel shape, mechanism for embossing characters on the strip between feeding impulses, mechanism for shearing the strip between embossed and unembossed portions, and continuously rotating rolls for bending in the edges of the embossed and sheared strip.

117. In an embossing machine, the combination with the embossing dies, of periodically actuated mechanism for feeding material thereto to be embossed, continuously operated rolls for discharging the embossed strip, and means for shearing the embossed portion of the strip from the unembossed portion.

118. In an embossing machine, the combination with embossing dies, of a keyboard for operating the dies, mechanism operated by the keyboard for feeding a strip to be embossed to the dies, continuously operated mechanism for discharging the embossed strip, and means for shearing the embossed portion of the strip from the unembossed portion of it.

119. The combination with a die head having male and female dies arranged in two rows with a space between them, means for guiding a strip of material along the space between the rows, mechanism for moving the die head and positioning it to bring selected dies into registration with the embossing mechanism, means for automatically actuating the embossing mechanism to emboss the intermediate strip, means for flanging the edges of the strip before it comes to embossing position, and means for bending inwardly the flanged edges after it leaves the embossing position.

120. In a machine of the character described, the combination with a reciprocable die head having male and female dies arranged in two rows with a space between them, means for guiding a strip of material along the space between the rows, a keyboard, mechanism controlled thereby for feeding the strip step by step, mechanism controlled by the keyboard for reciprocating the die head to bring selected dies to active position, embossing mechanism adapted to act on the positioned die to emboss said strip, means for shearing the embossed strip at the end of a line of characters, and means for bending in the edges of an embossed and sheared strip.

121. The combination with a reel adapted to carry a ribbon of flat material, a pair of combined feeding and forming rolls which are adapted to fed the ribbon and at the same time flange the edges of it, a stationary rib which the channel shaped ribbon thus formed is adapted to embrace, and embossing dies adapted to operate in a gap in said rib.

122. The combination with a pair of coacting rolls adapted to flange the edges of a flat strip and feed it, a rib which the channel shaped strip thus formed embraces, a member opposed to the rib to hold the strip thereon, there being registering gaps in the rib and member, and embossing dies adapted to act through said gap.

123. In an embossing machine, the combination of two stationary bars extending across the machine, one of them having a rib, means for feeding a flanged strip onto the rib at one end and along the rib, the strip being held on the rib by the other frame bar, and means for delivering the formed strip from the other end of the strip, comprising a pair of coacting rolls which bend inwardly the edges of the strip.

124. In a machine of the character described, the combination with mechanism for embossing the intermediate portion of a strip having flanged edges, of mechanism for shearing such strip, first through the corners where the flanges join the intermediate portions, and then through the intermediate portions.

125. In a machine of the character described, the combination of means for guiding a flanged strip, a pair of dies for shearing the same, one die being adapted to occupy the space between the flanges and having a groove extending transversely of the strip and the other die having a plunger standing opposite said groove, the active edge of the plunger having inclined portions adapted to engage the corners of the flanged strip, and an intermediately located hump to engage the intermediate portion.

126. In a machine of the character described, the combination of mechanism for flanging the edges of a strip, mechanism for embossing the intermediate portion of such strip, and mechanism for cutting out a short U-shaped section of the flanged strip.

127. In an embossing machine, the combination of a reciprocating die head having a set of cooperating male and female character dies, means for guiding a ribbon of material along a fixed path between the dies in a direction parallel to that of the reciprocation of the die head, a keyboard having keys corresponding to said dies, mechanism controlled by the keyboard for embossing by means of said character dies, shearing dies carried by the die carrier, and means for moving each of said shearing dies toward the other.

128. In an embossing machine, the combination of embossing mechanism, means for feeding and flanging a strip to be embossed, a pair of coacting shearing dies, one of which has a groove and the other a plunger adapted to enter said groove, and which are adapted to shear said flanged strip.

129. In an embossing machine, the combination of means for embossing a channel-shaped strip, of shearing dies, one of which has a groove extending crosswise of the strip and notches for receiving the flanges of the channel shaped strip, the other of which has a plunger adapted to stand opposite said groove and coact with the walls of the groove to shear out an intermediate portion of the strip 130. In an embossing machine, the combination of means for flanging a strip to make it channel shape, means for embossing such strip, shearing dies, one of which has a groove extending crosswise of the strip and notches for receiving the flanges thereof, the other of which has a plunger adapted to stand opposite said groove and coact with the walls of the groove to shear out an intermediate portion of the strip.

131. In an embossing machine, the combination of rolls for forming flanges on a strip, dies for embossing such strip, and shearing members, one of which has notches for receiving the flanges of the strip.

132. In an embossing machine, the combination of means for forming and feeding a channel-shaped strip, dies for embossing it, shearing dies, one of which has a groove extending crosswise of the strip and notches for receiving the flanges of the strip, the other of which has a plunger adapted to stand opposite said groove and coact with the walls of the groove to shear out an intermediate portion of the strip, power mechanism for operating the embossing and shearing dies, and a keyboard to control such power mechanism.

133. In an embossing machine, the combination with embossing dies and shearing dies, a keyboard having character keys for actuating the embossing dies and having a shearing key for actuating the shearing dies, and power mechanism operated thereby for shearing an embossed strip.

134. The combination of a die head having embossing dies, each of which has a plurality of characters, a keyboard having keys corresponding to the dies, a shift mechanism serving to shift the die head relative to the material to be embossed to enable the same key to operate any character on the corresponding die, a shearing die carried by the die head and effective in one position thereof, and an interlocking device between the means for operating the shearing die and the shift mechanism.

135. The combination of a die head carrying embossing dies arranged in longitudinal rows, different characters being in the same row and different faces of the same character being adjacent in a different row, a shearing die carried by the die head and located in one of said rows, a shift mechanism adapted to change the row which is active, means for operating the shearing die, and means whereby such operation insures the shift mechanism properly positioning the die head for shearing.

136. In an embossing machine, the combination with a movable die head having male and female dies, each with a plurality of characters thereon, means for moving it laterally to position selected dies, shift mechanism coacting with the die head to move it transversely of its lateral travel to bring different characters to active position, a shearing die carried by the die head and operative in one shift position thereof, a shearing lever for operating the shearing die, and means between said shearing lever and the shift mechanism to insure the proper shift position of the die head when the shearing lever is operated.

137. The combination of embossing dies providing a plurality of related faces, a shift mechanism for positioning the dies according to the face desired, a latch for said shift mechanism adapted to hold it in a shifted position, shearing mechanism operative when the shift mechanism is in its non-shifted position, a shearing key for actuating the shearing mechanism, and a connection between the shearing key and the shift latch adapted to release the latch when a shearing key is operated.

138. The combination of a movable die head having embossing dies, each with a plurality of faces, a shift mechanism for positioning the die head according to the face desired, a latch for said shift mechanism adapted to hold it in a shifted position, a shearing die carried by the die head and operative when it is in its non-shifted position, a manual device for actuating the shearing die, and a connection between such device and the shift latch adapted to release the latch when such device is operated, whereby the die head is necessarily in non-shifted position when the shearing die is operated.

139. The combination with a die head having co-operating male and female dies with a space between them, means for supporting a strip to be embossed in such space, means for operating the die head and dies to emboss the strip, means for cutting out a section of such strip, and a device adapted to enter the space made by such cutting and feed the embossed portion of the strip.

140. The combination with a die head having rows of cooperating male and female dies with a space between them, means for supporting a strip to be embossed in such space, means for operating the die head and dies to emboss the strip, and a device extending into such space for engaging and feeding the embossed strip.

141. The combination with a die head having rows of cooperating male and female dies with a space between them, means for supporting a strip to be embossed in such space, a keyboard and mechanism controlled thereby for operating the die head and dies to emboss the strip, and to feed the strip, means for cutting out a section of such strip, and a device adapted to extend into the cut out space for engaging and feeding the embossed strip.

142. The combination with a movable die head having male and female embossing dies with a space between them, means for guiding a strip to be embossed in such space, mechanism for shearing such strip after it has been embossed, and a discharge device adapted to engage the sheared off portion of the strip and advance the same.

143. The combination with embossing dies, of means for feeding a strip of material between them, mechanism for delivering the finished embossed strip from the machine, mechanism for shearing the strip following its embossing and before its delivery, and a manually operated device for feeding the sheared off portion of the strip to the delivery mechanism.

144. In an embossing machine the combination with means for feeding a strip to be embossed, of dies for embossing characters thereon, a shearing means for cutting off the embossed portion of the strip, continuously rotating delivery rolls for said strip, and a reciprocating discharge device for conveying the embossed and cut off portion of the strip to the delivery rolls.

145. The combination with a die head having male and female dies with a space between them, a guide in said space for positioning a strip to be embossed by such dies, a dog extending into the space between the dies and movable lengthwise of the strip, means for guiding said dog whereby it may normally stand idly out of contact with the strip but may be moved to engage the strip to discharge the same.

146. The combination with a reciprocatory die head having male and female dies arranged in two rows with a space between them, a guide in said space for positioning a strip to be embossed by such dies, means for shearing the embossed strip, a dog extending into the space between the dies and movable lengthwise of the strip, means for guiding said dog whereby it may normally stand idly out of contact with the strip but may be moved to engage the rear edge of the sheared off portion of the strip to discharge the same.

147. The combination with a horizontally movable die head having male and female dies arranged in two rows with an upwardly open space between them, a guide in said space or positioning a strip to be embossed by such dies, means for shearing the embossed strip, a dog adapted to depend into the space between the dies and movable lengthwise of the strip, a roller on said dog, and means on which the roller rides to hold it normally out of contact with the strip but to allow it to descend at the proper point to engage the rear edge of the sheared off portion of the strip to discharge the same.

148. The combination of mechanism for embossing material to distort it inwardly on one side and oppositely on the other side, mechanism for printing on one side of a piece of paper, and a single keyboard for simultaneously controlling both mechanisms.

149. The combination with a keyboard having individual character keys, of embossing mechanism comprising pairs of male and female dies, different pairs having different characters corresponding to the keys, means for guiding material to be embossed between said dies, and means for causing said dies to approach each other, and printing mechanism, both the printing mechanism and the embossing mechanism being operable by the same character key.

150. The combination of pairs of male and female dies, means for rendering certain pairs active, means for moving the active dies toward each other to emboss interposed material, means for printing a character corresponding to the character embossed, means for feeding a metal strip to be embossed and paper to be printed, a keyboard having finger keys corresponding to the different characters, and mechanism controlled thereby for operating all of the means mentioned.

151. The combination with a die head having coacting male and female dies, a printing device having characters corresponding to the dies, means for positioning the die head according to the character desired, means for correspondingly positioning the printing device, means for causing the embossing and printing operations, and a keyboard having finger keys adapted to control all of the means mentioned.

152. The combination with a die head having male and female embossing dies, a printing wheel having characters corresponding to those of the dies, and a keyboard having finger keys adapted to position the die head and the printing wheel each to correspond with the key actuated.

153. The combination with a reciprocable die head having male and female embossing dies, an oscillatory printing wheel having characters corresponding to those of the dies, and a keyboard and power mechanism controlled thereby to position the die head and the printing wheel each to correspond with the key actuated.

154. The combination of a reciprocable die head having a set of embossing dies, a printing wheel having characters corresponding to those on the dies, gearing between the printing wheel and die head so that they may be mutually positioned.

155. The combination with a laterally movable die head, embossing dies carried thereby, a rack carried by the die head, a printing wheel having characters corresponding to the dies, a pinion adapted to move the wheel and meshing with the rack.

156. The combination of a reciprocable die head having a set of embossing dies, a printing wheel having characters corresponding to those on the dies, gearing between the printing wheel and die head so that they may be mutually positioned, a pair of rams for the dies and a platen for the printing wheel, and mechanism for operating the rams and platen to effect the embossing and printing.

157. In a machine of the character described, the combination of a die head having a row of embossing dies, a keyboard, mechanism controlled thereby for moving said die head in a direction parallel with said row, each die having a plurality of characters arranged at right angles to said row, a shift mechanism for moving the die head parallel with said plurality of characters, a printing device having characters corresponding to those on the dies, and means for moving the printing device in two directions in correspondence with the movement of the die head.

158. The combination with a laterally movable die head carrying embossing dies, each character die having plural faces, means for elevating the die head to change its face presented, a printing wheel having a plurality of rows of characters, means for rotating the wheel in correspondence with the lateral movement of the die head, and means for elevating the wheel in correspondence with the elevation of the die head.

159. The combination with a laterally movable die head carrying embossing dies, each character having plural faces, a shift mechanism for elevating the die head to change its face presented, a printing wheel having a plurality of rows of characters, means for rotating the wheel in correspondence with the lateral movement of the die head, and a connection between the wheel and die head, whereby the elevation of the die head correspondingly elevates the wheel, a keyboard having finger keys, and power mechanism controlled thereby for laterally positioning the die head.

160. The combination of a reciprocable die head having a row of embossing die blocks each die block having a plurality of die faces, a keyboard, mechanism controlled thereby for moving the die head, a shift mechanism associated with the keyboard for shifting the die head transversely of its path of travel according to the face desired on the dies, a printing wheel having a plurality of circumferential rows of characters, said circumferential rows corresponding to the rows of dies, and the characters in line in the different circumferential rows corresponding to the characters on the end of the corresponding die blocks, a platen for said printing wheel, means whereby the actuation of any key causes the printing wheel to be turned in correspondence with the position of the die head, and means whereby the actuation of the shift changes the presentation of the printing wheel to its platen to bring a different row on the wheel into cooperation therewith corresponding to the row of characters which are active on the die head.

161. The combination of embossing dies, a printing wheel, a paper carriage adapted to move into coaction with the printing wheel, mechanism for concurrently operating the dies and paper carriage to emboss and print, feeding mechanism for the paper carriage comprising a ratchet, a moving pawl and a retaining pawl, and means for automatically operating the moving pawl consequent upon the movement of the paper carriage to and from the printing wheel.

162. The combination with a printing wheel, of a paper carriage longitudinally movable on a shaft which is mounted in levers, said levers being adapted to swing the carriage toward and from impressing position, and means for feeding the carriage lengthwise of its shaft, embossing mechanism, and common power mechanism for operating the same and said levers.

163. The combination of means for embossing successive lines of characters in a single row on a plurality of pieces of material, means for printing lines of corresponding characters in a plurality of superposed rows, each row corresponding to one of said pieces, and a common actuator for both the embossing and printing mechanisms.

164. The combination with a printing wheel, of a paper carriage longitudinally movable on a shaft which is mounted in levers, means for swinging said levers to move the carriage toward and from impressing position, means for feeding the carriage lengthwise of the shaft, means for releasing the carriage and returning it, a beveled teeth device carried by one of said levers and adapted to engage teeth on the carriage to turn it when it is longitudinally returned, and mechanism for giving an additional turn to the paper carriage.

165. In an embossing and printing machine the combination of embossing dies, printing mechanism, a keyboard adapted to actuate both mechanisms, and means whereby the embossing is effected in a single row and the printing in a plurality of rows, the change of printing from one line to the next being consequent upon the cutting of the strip between embossed and unembossed portions.

166. In an embossing and printing machine, the combination of embossing mechanism, printing mechanism, and an actuating device operating to shear the embossed material and concurrently present a fresh region of paper.

167. The combination, with a mechanism for embossing a strip of material, of mechanism for printing a record, shearing means for cutting the embossed strip, means for moving the paper which has been printed, and an actuating member coupled with both the shearing means and the paper moving mechanism.

168. The combination with embossing mechanism, printing mechanism, finger keys for operating both of said mechanisms to emboss and print substantially duplicate characters, mechanism for shearing the material embossed, mechanism for moving the paper to present a lower space for receiving printing and a single key for actuating the two mechanisms last mentioned.

169. The combination of a mechanism for embossing a strip of material, mechanism for printing a record, a shearing die for cutting the embossed strip, means for presenting to the printing member a lower region of paper than that printed and an actuating member coupled with both the shearing die and said paper presenting mechanism.

170. In an embossing and printing machine, the combination of embossing mechanism, printing mechanism comprising a printing member and a combined platen and paper carriage, and a common actuating device operating to shear the embossed material and turn the paper carriage axially.

171. The combination with means for embossing a strip, of means for printing a record, a keyboard, the keys of which are adapted to actuate both the embossing and printing mechanisms, means for cutting off the embossed strip, and means operated consequent upon the actuation of the cutting off mechanism for returning the paper and moving it to present a space below that already printed.

172. In an embossing and printing machine, the combination of means for embossing successive lines of characters in a single row on a strip, means for shearing such strip following the embossing of the characters which are to constitute a line, means for printing each line by the same manual operation which effects the embossing, and means whereby the cutting off of the embossed strip results also in repositioning the mutual relation of the paper and printing device whereby the subsequent line embossed is printed below the preceding line printed.

173. In an embossing and printing machine, the combination of embossing dies, a keyboard and mechanism actuated thereby for embossing successive lines of characters in a single row on a strip, means for shearing such strip following the embossing of the characters which are to constitute a line, means for printing each line by the actuation of the same keys which effect the embossing, and means whereby the cutting off of the embossed strip results also in repositioning the mutual relation of the paper and printing device, whereby the subsequent line embossed is printed below the preceding line printed.

174. In an apparatus for producing printing strips, the combination of means for flanging the edges of a strip, means for thereafter embossing the strip, and means for thereafter bending inwardly the flanged edges.

175. In an apparatus for producing printing strips, the combination of means for flanging the edges of the strip, means for embossing the flanged strip with a row of characters, means for thereafter cutting off such embossed portion of the strip, and means for bending in the edges of the flanged and embossed strip.

176. In an apparatus for producing printing strips, the combination of means for embossing a line of characters on an intermediate region of a strip of material, and means for thereafter bending inwardly the opposite edges of such embossed strip.

177. In an apparatus for producing printing strips, the combination of means for embossing characters on a strip, and a pair of coacting rolls for bending inwardly the edges of such embossed strip.

178. In an apparatus for producing printing strips, the combination of a pair of rolls for flanging the edges of a strip, keyboard controlled dies for thereafter embossing a row of characters on such strip, and a pair of coacting rolls for bending inwardly the flanged edges of such embossed strip.

179. In a machine of the character described, the combination with intermittently coacting rollers for flanging the edges of a flat strip, of dies of different characters and means for operating them to emboss said strip during a period of intermission.

180. In a machine of the character described, the combination of a keyboard, a set of male and female dies of different character corresponding to the keys of the keyboard, mechanism controlled by the keyboard for flanging the edges of a strip, and for operating selected dies to emboss the strip between the flanged edges.

181. The combination with mechanism for flanging the edges of a flat strip, mechanism for then embossing the intermediate region of the strip with a single row of printing characters, and mechanism for thereafter bending inwardly the flanged edges.

182. The combination of a keyboard, dies of various characters actuated thereby for embossing a line on an intermediate region of a strip of material, mechanism for then shearing the strip, and rolls for then bending inwardly both edges of the strip.

183. In a machine of the character described, the combination of mechanism for flanging the edges of a strip, a keyboard, male and female dies of various characters for embossing the intermediate portion of such strip, and manually controlled mechanism for cutting out a short U-shaped section of the flanged strip.

184. In a machine of the character described, the combination of a die carrier reciprocable as a unit, male and female dies in coacting pairs mounted therein, each pair having a different character face, means for periodically feeding a continuous ribbon between the male and female dies, a keyboard, and mechanism controlled thereby for causing the operation of said dies.

185. The combination of a reciprocable die carrier having male and female dies, the faces of which are formed to produce raised printing characters differing with different dies, mechanism for reciprocating said carrier, and a keyboard for controlling it having keys corresponding to said characters.

186. In an embossing machine, the combination of a movable die carrier, male and female dies in coacting pairs mounted therein, each pair having a different character face, a keyboard, power mechanism controlled thereby to shift the die carrier in either direction from a central position of rest, and mechanism for causing selected male and female dies to approach each other.

187. The combination of a die carrier reciprocable as a unit, a set of cooperating male and female dies mounted in the carrier and adapted to emboss various raised printing characters on interposed material, power mechanism for moving said die carrier, a keyboard, mechanism operated thereby to initiate the operation of said power mechanism, and mechanism for causing selected dies to approach each other to effect an embossing operation.

188. The combination of a die carrier movable as a unit in a straight line and having a set of coacting pairs of male and female dies, each pair having a face corresponding to a different printing character, whereby raised printing characters may be formed on intermediate material, a roll of ribbon to be embossed, means for guiding it between said dies in a straight line parallel with the path of the die carrier, power mechanism for moving said die carrier, power mechanism for operating properly positioned dies to effect the embossing, a keyboard, and mechanism operated thereby to initiate the operation of the mechanism for moving the dies carrier and to stop the same with the proper dies in active position and for initiating the operation of the embossing mechanism.

189. In a machine of the character described, the combination with a set of male and female dies in coacting pairs, each pair having a face corresponding to a different printing character, whereby raised printing characters may be formed on intermediate material, a carrier in which the same are movably mounted, a fixed guide for a ribbon of material to be embossed passing between the coactable dies, mechanism adapted to move the carrier from a definite position of rest to various positions for action, a keyboard adapted to initiate the operation of said mechanism and also to stop the movement of the set of dies with that pair of dies having a face corresponding to the key actuated in active position, means for moving selected male and female dies each toward the other to effect embossing, and means for periodically progressing the ribbon of material along the guide.

190. In a machine of the character described, the combination with a set of male and female letter character dies, a fixed guide for a ribbon of material adapted to pass between male and female dies, power mechanism adapted to move said set of male and female dies as a unit from a definite position of rest to various positions for action, a keyboard having letter character keys adapted to initiate the operation of the power mechanism and also to stop the movement of the set of dies with the particular dies corresponding to the key actuated in active position, means for causing selected male and female dies to approach each other to effect embossing, and mechanism for automatically progressing the ribbon along the guide.

191. In a machine of the character described, the combination of a set of male and female dies in coacting pairs, each pair having a different character face formed to produce raised printing characters on interposed material, means for holding said set of dies, mechanism adapted to move said set in either direction from a central position of rest to various positions for action, a keyboard having keys corresponding to the different pairs of dies adapted to initiate the operation of said mechanism and also to stop the movement of the set of dies with the particular dies corresponding to the key actuated in active position, and means for moving selected male and female dies each toward the other to effect embossing.

192. In an embossing machine, the combination of a die head, cooperating male and female dies carried thereby, different pairs of dies being adapted to emboss different printing characters, keyboard adapted to cause reciprocation of the die head and having keys corresponding to the different pairs of dies, and means for moving positioned dies toward each other to effect the embossing.

193. The combination of a die head carrying male and female dies in coacting pairs, each pair having a different character face formed to produce raised printing characters on interposed material, means for holding said set of dies, of a keyboard, and mechanism controlled thereby for moving the die head in either direction from a central position of rest, and means for causing positioned dies to approach each other to effect the embossing.

194. The combination, with a normally stationary die head carrying a set of male and female dies of various characters and movable in either direction from a central position of rest, finger keys corresponding to the different die characters, mechanism operated thereby divided into two groups, one of which controls the movement of the die head in one direction and the other in the opposite direction, and means for causing selected male and female dies to approach each other to effect the embossing.

195. In an embossing machine, the combination of a die carrier adapted to move back and forth, differently formed pairs of coacting male and female dies movably mounted in the carrier, means for stopping the movement of the carrier, shock absorbing means to cushion the blow as the die carrier is stopped, and means for moving selected male and female dies each toward the other to effect the embossing.

196. The combination of a die head, coacting pairs of male and female dies movably mounted in the head and having different embossing faces, a bar on which the die head is mounted for lateral travel, a pair of slides in which the ends of the bar are mounted, and a shift mechanism for operating the slides.

197. The combination with a reciprocable die head having a central position of rest, coacting pairs of male and female dies of different character mounted therein, of a key-board, mechanism actuated thereby for moving the die head in either direction from its position of rest, a center lock for the die head to hold it in its normal position, and means whereby actuation of the key releases said center lock.

198. In an embossing machine, the combination of a movable die head carrying male and female dies of different characters, means tending to return the die head to normal position, a keyboard, means whereby an actuated key lever provides a stop limiting the movement of the die head, a latch for holding said key lever in actuated position, mechanism for effecting the embossing, and means for releasing the latch after the embossing has taken place.

199. The combination of pairs of coacting male and female dies, each pair being adapted to emboss a different character, means for rendering certain pairs active, means for moving the active pair of dies each toward the other to emboss interposed material, means for printing a character corresponding to the character embossed, means for feeding a metal strip to be embossed and paper to be printed, a keyboard having finger keys corresponding to the different pairs of dies, and mechanism controlled thereby for operating all of the means mentioned.

200. In a machine of the character described, the combination, with a set of male and female dies in coacting pairs with their faces constantly opposite each other, each pair having a different character face and being adapted to form a raised character on intermediate material, of a shiftable head rigid with itself for holding such dies, and means for holding a continuous ribbon of material to be embossed, of mechanism for moving said head to select the pair of dies to be active, mechanism for causing selected dies to approach each other to effect the embossing, mechanism for intermittently moving said ribbon a character space, a keyboard adapted to start the operation of said mechanisms, and means for shearing such continuous ribbon following the embossing of the characters thereon.

201. In a machine of the character described, the combination of a set of male and female dies in coacting pairs, each pair having a different character face formed to produce raised printing characters on interposed metal ribbon a shiftable member for holding said set of dies, and means for guiding said metal ribbon, said member having a central position of rest, mechanism for moving the same in either direction therefrom, a keyboard for controlling such movement, and means for causing selected male and female dies to approach each other to effect embossing.

202. The method of producing printing strips comprising flanging the edges of the strip, thereafter embossing the strip between the flanged edges while it is guided by its flanges and thereafter bending the flanges inwardly.

203. The method of producing printing strips consisting of flanging the edges of a strip, then embossing a row of characters along an intermediate region of the strip while it is guided by its flanges, then cutting off the embossed portion, then bending inwardly the flanges of such cut off portion.

204. The method of producing line strips for printing, comprising successively embossing characters on a strip to produce a single line of a height nearly equal to the width of the strip, thereafter cutting such line free from the rest of the strip, thereafter bending inwardly the edges of such cut off line into a region formerly occupied by the embossing mechanism.

205. As a new article of manufacture, a printing strip comprising an integral strip of metal having embossed thereon a single row of characters to print a single line having a height nearly equal to the width of the strip, the edges of said strip extending away from the body portion and converging toward each other on the side of the strip opposite the raised characters.

In testimony whereof, I hereunto affix my signature.

CLIFTON CHISHOLM.